United States Patent
Kang et al.

(10) Patent No.: US 11,516,478 B2
(45) Date of Patent: Nov. 29, 2022

(54) METHOD AND APPARATUS FOR CODING MACHINE VISION DATA USING PREDICTION

(71) Applicants: Hyundai Motor Company, Seoul (KR); Kia Corporation, Seoul (KR); Ewha University—Industry Collaboration Foundation, Seoul (KR)

(72) Inventors: Je Won Kang, Seoul (KR); Chae Hwa Yoo, Seoul (KR); Seung Wook Park, Gyeonggi-do (KR)

(73) Assignees: Hyundai Motor Company, Seoul (KR); Kia Corporation, Seoul (KR); Ewha University-Industry Collaboration Foundation, Seoul (KR)

(*) Notice: Subject to any disclaimer, the term of this patent is extended or adjusted under 35 U.S.C. 154(b) by 0 days.

(21) Appl. No.: 17/565,545

(22) Filed: Dec. 30, 2021

(65) Prior Publication Data
US 2022/0210435 A1    Jun. 30, 2022

(30) Foreign Application Priority Data

Dec. 30, 2020 (KR) .......................... 10-2020-0187062
Dec. 20, 2021 (KR) .......................... 10-2021-0182334

(51) Int. Cl.
| | | |
|---|---|---|
| H04N 19/00 | (2014.01) | |
| H04N 19/147 | (2014.01) | |
| G06V 10/77 | (2022.01) | |
| H04N 19/176 | (2014.01) | |
| H04N 19/196 | (2014.01) | |
| H04N 19/105 | (2014.01) | |

(52) U.S. Cl.
CPC ....... *H04N 19/147* (2014.11); *G06V 10/7715* (2022.01); *H04N 19/105* (2014.11); *H04N 19/176* (2014.11); *H04N 19/196* (2014.11)

(58) Field of Classification Search
CPC ..................................................... H04N 19/00
See application file for complete search history.

(56) References Cited

U.S. PATENT DOCUMENTS

2022/0103831 A1*   3/2022   Li ..................... G06K 9/6232

OTHER PUBLICATIONS

K. Simonyan et al., "Very Deep Convolutional Netowrks for Large-Scale Image Recognition",Published as a conference paper at ICLR 2015.

* cited by examiner

*Primary Examiner* — Maryam A Nasri
(74) *Attorney, Agent, or Firm* — Fox Rothschild LLP

(57) ABSTRACT

The present disclosure relates to an apparatus for and a method of coding machine vision data by using prediction, and for improving the efficiency of encoding the data used for machine vision, provides an apparatus for Video Coding for Machines (VCM) which sets reference data according to a correlation between the data, generates, based on the reference data, prediction data for original data having a high correlation with the reference data, and generates residual data between the prediction data and the original data, and provides a coding method performed by the apparatus for VCM.

20 Claims, 16 Drawing Sheets

METHOD AND APPARATUS FOR CODING MACHINE VISION DATA USING PREDICTION

CROSS-REFERENCE TO RELATED APPLICATIONS

This application is based on, and claims priority to Korean Patent Application No. 10-2020-0187062 filed on Dec. 30, 2020, and Korean Patent Application No. 10-2021-0182334 filed on Dec. 20, 2021, the disclosures of which are incorporated by reference herein in their entireties.

TECHNICAL FIELD

The present disclosure relates to an apparatus a method for coding machine vision data by using prediction.

BACKGROUND

The statements in this section merely provide background information related to the present disclosure and do not necessarily constitute prior art.

As machine vision applications enter their big-bang moment with the development of deep learning technology and the development of computing power, the spreading recognition is that most of the video traffic will be used by machines. Machine-to-machine applications are expected to account for the largest use of Internet video traffic in the future. Therefore, a method of optimizing the information of video data used by a machine can be a key factor in terms of innovation in video processing technology and the commercialization of new solutions.

Existing video coding schemes are optimized for human vision because they aim for the best image or image quality under certain bit rate constraints. Meanwhile, for the purpose of coding for machine vision, the reconstructed image/video needs not to have high visual performance. With the advent of connected vehicles, Internet of Things (IoT) devices, super-large video surveillance networks, smart cities, and quality inspection with strict limits on latency and scale, a new paradigm has emerged and brought about the need for a new image/video coding method targeting machine vision.

Accordingly, Moving Picture Expert Group (MPEG), the standardization organization discussed the necessity of standardization for machine vision, resulting in the proposed next-generation video codec of Video Coding for Machines (VCM) that provides compressed coding for machine vision data and compressed coding for human-machine hybrid vision.

There may be various modifications to the structure of the VCM codec, but the basic structure of the VCM codec is as illustrated in FIG. 16. When video, which is output from the sensor, is inputted, a VCM encoder extracts features as information for machine vision, performs feature conversion on the features to suit the needs, and then encodes the converted features. Additionally, the VCM encoder may refer to an encoded feature when encoding the input images or video. Finally, the VCM encoder generates a bitstream by encoding the features and input images (or residual images) for machine vision. The VCM encoder multiplexes and transmits bitstreams respectively generated by encoding the features and the video.

A VCM decoder demultiplexes the transmitted bitstream into a feature bitstream and a video bitstream, and then decodes the features and the video, respectively. Here, the VCM decoder may refer to a reconstructed feature when decoding the video. Reconstructed features after undergoing inverse conversion may be used for both machine vision and human vision.

Additionally, as illustrated by FIG. 16, an interface for a neural network may be used to apply a deep learning model to extracting features in the VCM encoder, performing a task for machine vision in the VCM decoder, etc.

Meanwhile, a self-driving system is a representative multi-task system among use cases of VCM technology. Here, multi-tasks performed by the machine include multi-object detection, object segmentation, object (e.g., line) tracking, action recognition or action localization, event prediction, and the like. In general, a single-task deep learning model is trained for each of the tasks described above by using video obtained from sensors such as cameras, infrared ray sensors, LiDAR, radar, and ultrasonic wave sensors, and then the learned single-task models may be used by a machine to perform each of the relevant tasks.

In the deep learning technology that is being developed to be suitable for various classification and inference tasks as described above, a discussion is needed on how to find representations suitable for machine vision and efficiently compress them. In other words, these new representations need to be considered in terms of significantly reducing transmission costs compared to the existing compression methods centered on human vision and providing information necessary to operate a system for machine vision with high accuracy.

SUMMARY

The present disclosure in some embodiments seeks to provide a VCM (Video Coding for Machines) apparatus for and a VCM method of coding machine vision data by using prediction. More specifically, to improve the encoding efficiency of data used for machine vision, the present disclosure seeks to provide a VCM apparatus which sets reference data according to the correlation between the data, generates, based on the reference data, prediction data for original data having a high correlation with the reference data, and generates residual data between the prediction data and the original data, and provide a coding method performed by the VCM apparatus.

According to at least one embodiment, the present disclosure provides a coding method performed by a coding apparatus of a machine vision system for coding feature maps of video frames. The coding method includes: extracting, from a key frame, a reference feature map that is a feature map of the key frame by using a machine task model that is based on deep learning, the key frame being selected from the video frames in terms of bit rate distortion optimization ; extracting, from remaining frames other than the key frame, an original feature map of each of the remaining frames by using the machine task model; generating a predicted feature map of each of the remaining frames based on the reference feature map; generating a residual feature map by subtracting the predicted feature map from the original feature map of each of the remaining frames; encoding the reference feature map, and encoding a residual feature map of each of the remaining frames.

According to another embodiment, the present disclosure provides a coding method performed by a coding apparatus of a machine vision system for coding a feature map of a main task and feature maps of subtasks. The coding method includes: extracting a reference feature map that is the feature map of the main task set among target tasks by using a machine task model that is based on deep learning; extracting, from the subtasks, an original feature map of each of the subtasks by using the machine task model; generating a predicted feature map of each of the subtasks based on the reference feature map; generating a residual feature map by subtracting the predicted feature map from the original feature map of each of the subtasks; encoding the reference feature map, and encoding the residual feature map of each of the subtasks.

According to yet another embodiment, the present disclosure provides a coding method performed by a coding apparatus of a machine vision system for coding a feature map of a machine task model including a plurality of layers The coding method includes: extracting, by using the machine task model and from an input image, a reference feature map that is an output feature map of a first layer; extracting, by using the machine task model and from the input image, an original feature map that is an output feature map of a second layer that is a layer deeper than the first layer in the machine task model; generating a predicted feature map based on the reference feature map; generating a residual feature map of the second layer by subtracting the predicted feature map from the original feature map; encoding the reference feature map, and encoding the residual feature map of the second layer.

As described above, according to some embodiments of the present disclosure, a VCM apparatus and method for coding machine vision data are provided to set reference data according to correlation between the data, to generate, based on the reference data, prediction data for original data having a high correlation with the reference data, and to generate residual data between the prediction data and the original data, which can improve the encoding efficiency of machine vision data according to the transmission of the residual data.

Further, according to some embodiments, by providing a VCM apparatus and method for generating prediction data based on reference data and generating residual data between the prediction data and original data, the present disclosure can offer useful operations based on the presence or absence of correlation between machine vision data and the reference data in various scenarios. Here, various scenarios include cases: with respect to a video input, where machine vision data is temporally and spatially correlated; where a system for machine vision performs multiple machine vision tasks with correlation being present between machine vision data of respective tasks; and where there is correlation between machine vision data according to the model architectures that perform a machine vision task.

DETAILED DESCRIPTION

Figure 1:
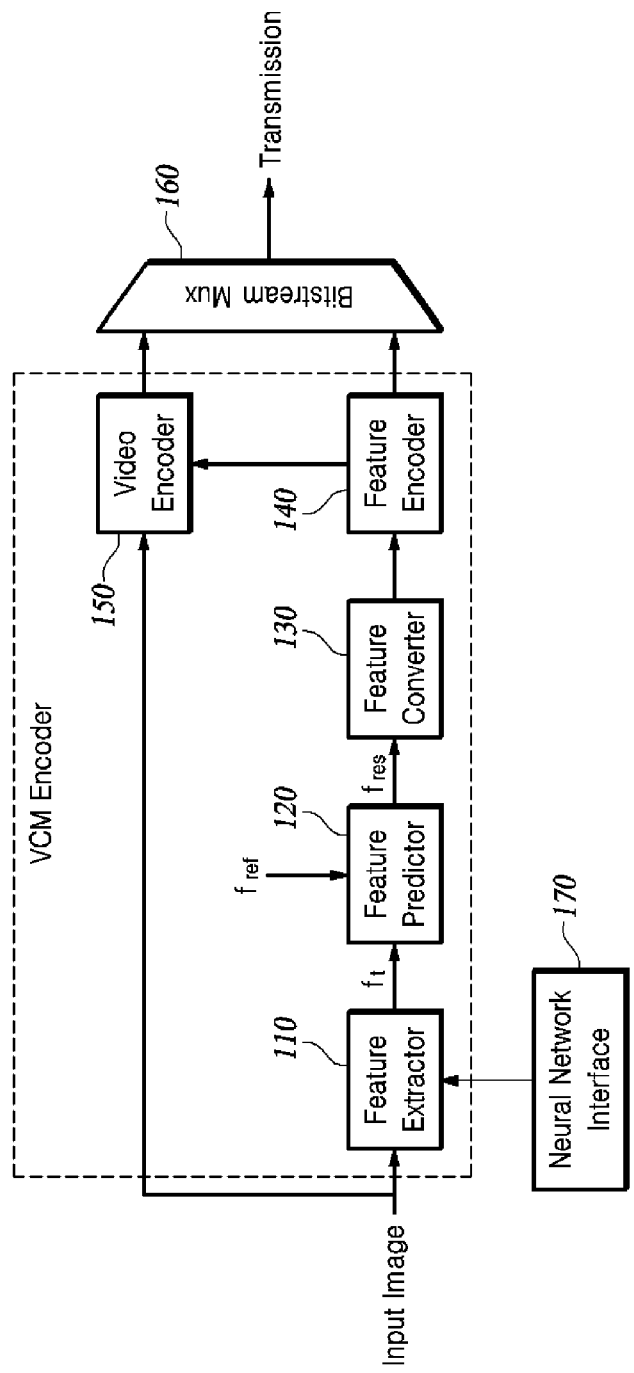
FIG. 1 is a conceptual block diagram of a VCM encoding apparatus or VCM encoder according to at least one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

The present disclosure in some embodiments seeks to provide a VCM apparatus for and a VCM method of coding machine vision data by using prediction. More specifically, to improve the encoding efficiency of data used for machine vision, the present disclosure seeks to provide a VCM apparatus which sets reference data according to the correlation between the data, generates, based on the reference data, prediction data for original data having a high correlation with the reference data, and generates residual data between the prediction data and the original data, and provide a coding method performed by the VCM apparatus.

Here, the apparatus for VCM or VCM codec includes a VCM encoder and a VCM decoder.

The embodiments of the present disclosure apply to any type of data used for machine vision, for example, a feature map outputted by a deep learning model. The embodiments are also applicable, in these feature maps, to a single piece of channel information, a screen division map, an attention map, and the like. In the following description, data used for machine vision is replaced with a feature map generated by a deep learning model.

In the following description, a feature map and a feature may be used interchangeably.

The following depicts, as a VCM encoder and a VCM encoding method, an apparatus and method for extracting, encoding, and transmitting a feature map from multi-tasks for machine vision, and as a VCM decoder and a VCM decoding method, an apparatus and method for decoding a feature map from a received bitstream. Accordingly, the VCM encoder and the VCM decoder according to the present disclosure may be an example of a multi-task system that performs multi-tasks. A multi-task system includes a single task system that performs a single task.

In the description that follows, a multi-task system, task system, machine vision system, or system may be used interchangeably to refer to a VCM codec. Additionally, a task, a machine task, a vision task, or a machine vision task may be used interchangeably.

On the other hand, the existing codecs for encoding and decoding a video signal to be optimized for human vision are depicted as a video encoder and a video decoder.

Figure 2:
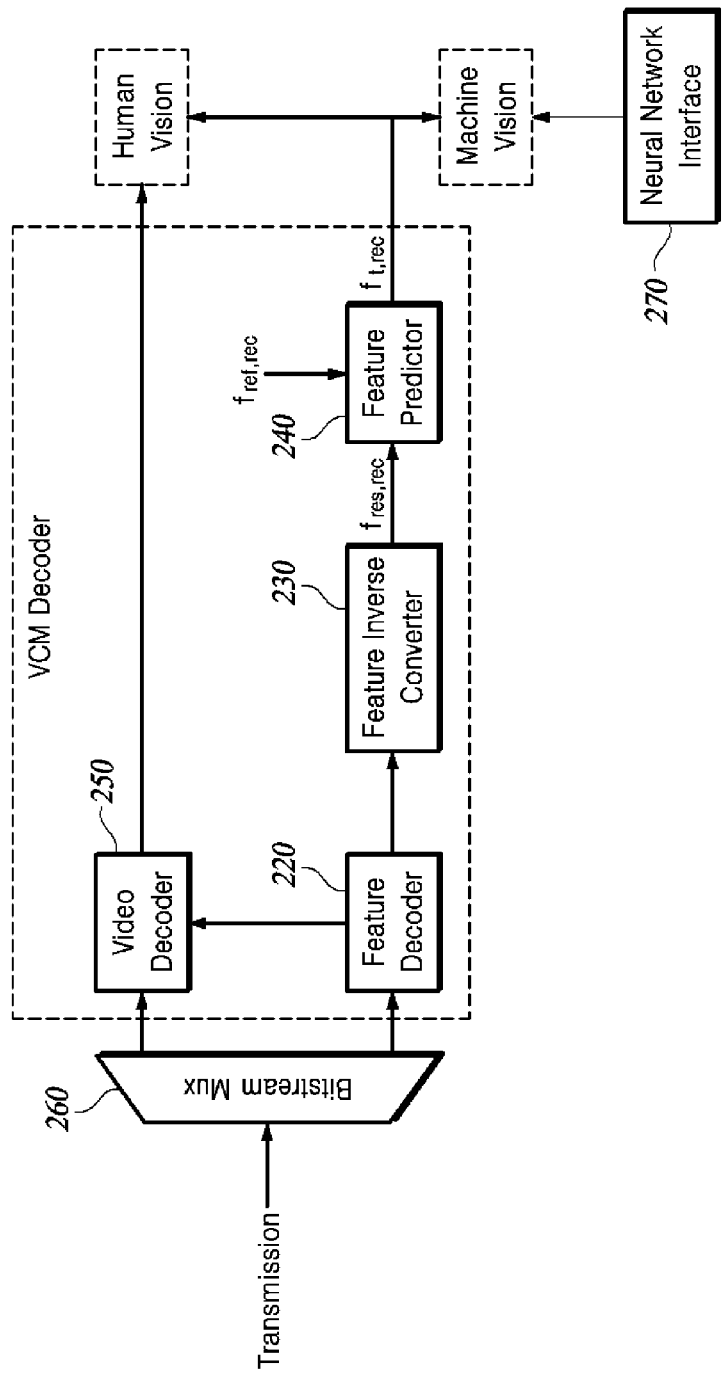
FIG. 2 is a conceptual block diagram of a VCM decoding apparatus or VCM decoder according to at least one embodiment of the present disclosure.

The following description uses the illustrations of FIGS. 1 and 2 to explain the operation of the VCM encoder and the VCM decoder, assuming that reference machine vision data exists having a high correlation with machine vision data to be encoded/decoded in the VCM codec.

FIG. 1 is a conceptual block diagram of a VCM encoding apparatus or VCM encoder according to at least one embodiment of the present disclosure.

The VCM encoder obtains video data corresponding to an output of a sensor or obtains input images. The VCM encoder extracts, from an input image, feature maps which are data for machine vision. The VCM encoder generates a predicted feature map by predicting an original feature map from reference machine vision data, that is, a reference feature map. The VCM encoder generates a residual feature map by subtracting the predicted feature map from the original feature map. The VCM encoder applies to the residual feature map a feature conversion such as data type conversion and feature map channel rearrangement that may be required during encoding and then encodes the converted residual feature map. In this case, the residual feature map may be referred to when encoding the input image (or a residual image generated from the input image) for human vision. The VCM encoder multiplexes the bitstream obtained by encoding the residual feature map for machine vision and the bitstream obtained by encoding the input image, and then transmits the multiplexed results to the VCM decoder.

The VCM encoder, as illustrated in FIG. 1, includes all or some of a feature extractor 110, a feature predictor 120, a feature converter 130, a feature encoder 140, a video encoder 150, a multiplexer 160, and a neural network interface unit 170. Here, components included in the VCM encoder according to the present disclosure are not necessarily limited to the illustrated components. For example, to train a plurality of deep learning models included in the VCM encoder, it may be configured in an implementation that is linked with an external training unit.

The feature extractor 110 operates based on a deep learning model to extract a feature map of a task for machine vision from an input image. Additionally, the deep learning model in the feature extractor 110 may perform a machine vision task, for example, to generate an analysis result of the machine vision task.

In the following description, such a deep learning model in the feature extractor 110 is called a machine task model.

As the machine task model in the feature extractor 110, any neural network model may be used as long as it is capable of generating a feature map suitable for the analysis of a machine vision task. For example, it may be a convolutional neural network- or CNN-based model implemented with a plurality of encoding layers and including a convolutional layer and a pooling layer.

The external training unit may train the machine task model in the feature extractor 110.

The feature predictor 120 generates a predicted feature map by predicting the original feature map from the reference feature map and then subtracts the predicted feature map from the original feature map to generate a residual feature map. A method of selecting a reference feature map and a predicting method for a predicted feature map will be described below.

The feature converter 130 applies conversions such as data type conversion and feature map channel rearrangement that may be required during encoding to the residual feature map. If no such conversion is necessary, the feature converter 130 may be omitted.

The feature encoder 140 encodes the residual feature map and thereby generates the corresponding bitstream.

The feature map of a general deep learning model has a size of W, H, or C. By matching channel size C with time, the common feature map may be assumed to be a video including C frames having a size of W×H (Width×Height). Accordingly, the feature encoder 140 may encode the residual feature map by using an existing video codec such as High Efficiency Video Coding (HEVC) or Versatile Video Coding (VVC). Alternatively, the feature encoder 140 may encode the residual feature map by using a deep learning-based autoencoder.

When using a deep learning-based autoencoder, the training unit may train the feature encoder 140 including up to a feature decoder 220 which is included in the VCM decoder and will be described below.

An autoencoder is a deep learning model that copies an input to an output. It looks like a simple deep learning model, but the autoencoder may generate a complex model by setting various constraints on the model. For example, by making the size of the hidden layer smaller than that of the input layer, the autoencoder can compress the data, that is, reduce the dimension. Alternatively, the deep learning model may be trained to reconstruct the original input by adding noise to the input data. These constraints prevent the autoencoder from simply copying the input directly to the output, and allow the autoencoder to learn how to represent data efficiently.

The autoencoder is always comprised of two parts, an encoder and a decoder. The present disclosure may set the size of output data of the encoder to be smaller than that of input data, thereby compressing input data to generate a bitstream.

The video encoder 150 encodes an input image for human vision, but it may refer to the residual feature map. For example, after generating a base image from the residual feature map and subtracting the base image from the input image to generate a residual image, the video encoder 150 may encode the residual image to generate a bitstream.

The video encoder 150 may be implemented using an existing video codec such as HEVC, VVC, or the like. Alternatively, it may be implemented by using a deep learning-based autoencoder.

When using a deep learning-based autoencoder, the training unit may train the video encoder 150 inclusive of a video decoder 250 which is included in the VCM decoder and will be described below.

The multiplexer 160 multiplexes a bitstream from encoding a residual feature map for machine vision and a bitstream from encoding an input image. The multiplexed bitstream may be transmitted to the VCM decoder.

The neural network interface 170 is a module for storing information (e.g., parameters) of deep learning models used in the VCM encoder. This module stores the parameters of the deep learning models trained by the training unit but does not need to be a component of the VCM encoder.

FIG. 2 is a conceptual block diagram of a VCM decoding apparatus or VCM decoder according to at least one embodiment of the present disclosure.

The VCM decoder obtains a multiplexed bitstream to thus obtain a bitstream corresponding to a residual feature map and a bitstream corresponding to an input image. The VCM decoder decodes the residual feature map from the bitstream. The VCM decoder generates a reconstructed residual feature map by applying a feature map inverse conversion to the residual feature map. The VCM decoder generates a predicted feature map from the reconstructed reference feature map, and then adds the predicted feature map to the residual feature map to generate a reconstructed feature map. The reconstructed feature map can be used simultaneously for machine vision and human vision. As illustrated in FIG. 2, the VCM decoder may include a feature decoder 220, a feature inverse converter 230, a feature predictor 240, a video decoder 250, a demultiplexer 260, and a neural network interface 270 in whole or in part.

The demultiplexer 260 demultiplexes, from the multiplexed bitstream, the bitstream used by the feature decoder 220, and the bitstream used by the video decoder 250.

The feature decoder 220 decodes the residual feature map from the bitstream. The feature decoder 220 may decode the residual feature map by using an existing video codec. Alternatively, the feature decoder 220 may decode the residual feature map by using a deep learning-based autoencoder.

The deep learning-based autoencoder when used may pre-train the feature decoder 220 up to and inclusive of the feature encoder 140.

The feature inverse converter 230 applies the feature map inverse conversion, which is the inverse process of the feature map conversion by the VCM encoder, to the residual feature map to generate a reconstructed residual feature map. When this conversion is not applied by the VCM encoder, the feature inverse converter 230 may be omitted.

The feature predictor 240 generates a predicted feature map from the reconstructed reference feature map, and then adds the predicted feature map to the reconstructed residual feature map to generate a reconstructed feature map. The prediction method of the predicted feature map will be described below.

Meanwhile, in the machine vision part illustrated by the dotted line box in FIG. 2, a machine vision task may be performed by using the reconstructed feature map.

When the input image or the residual image is transmitted to provide a more improved image to fulfill the human vision, the video decoder 250 decodes the input image or the residual image from the bitstream. Here, when reconstructing the input image from the residual image, the video decoder 250 may refer to the reconstructed residual feature map. For example, a base image may be reconstructed from the reconstructed residual feature map and the reconstructed base image may be added to the decoded residual image to reconstruct the input image.

The video decoder 250 may decode the residual image by using the existing video codec as described above. Alternatively, the residual image may be decoded by using a deep learning-based autoencoder.

The deep learning-based autoencoder when used may pre-train the video decoder 250 up to and inclusive of the video encoder 150.

The neural network interface 270 is a module for storing information (e.g., parameters) of deep learning models used in the VCM decoder. This module stores parameters of the deep learning models trained by the training unit, but it does not need to be a component of the VCM decoder.

On the other hand, when transmitting only single machine vision data or encoding a plurality of machine vision data and where no reference machine vision data exists, the VCM codec may perform encoding/decoding of vision data similar to the case of the video codec encoding the first frame. For example, the VCM encoder may encode the machine vision data by performing the remaining processes except for feature map prediction in the order of feature map extraction, feature map conversion, and feature map encoding. Additionally, the VCM decoder may decode the machine vision data by performing the remaining processes excluding feature map prediction in the order of feature map decoding, and feature map inverse conversion.

In the following description, the original feature map (or target feature map) to be transmitted by the VCM encoder is expressed as $f_t$, the referenced feature map as $f_{ref}$, the predicted feature map as $f_{pred}$, and the residual feature map transmitted to the VCM decoder as $f_{res}(=f_t-f_{pred})$. On the other hand, all feature maps reconstructed by the VCM decoder have the notation 'rec' added to the subscript of the feature map expression. For example, the reconstructed feature map is expressed as $f_{t,rec}$.

The following describes a predicting method for a predicted feature map, performed by the feature predictor 120 in the VCM encoder and the feature predictor 240 in the VCM decoder will be described.

First, as the simplest prediction method, the feature predictor 120 in the VCM encoder may set the reference feature map as the predicted feature map ($f_{pred}=f_{ref}$) without a separate prediction. Here, residual feature map $f_{res}$ transmitted to the VCM decoder is $f_t-f_{pred}$, and the feature predictor 240 in the VCM decoder also sets the reconstructed reference feature map as the predicted feature map ($f_{pred,rec}=f_{ref,rec}$) without separate prediction, and then reconstructed feature map $f_{t,rec}$ may be reconstructed to $f_{res,rec}+f_{pred,rec}$. Although this prediction method is the simplest to implement, it may not be able to utilize the coding gain derived from the feature map prediction.

As another embodiment, the intra prediction method and the inter prediction method used in existing video codecs such as HEVC and VVC may be used as they are. Here, a target feature map and a reference feature map may be used as inputs of the prediction methods. Selection between the intra prediction mode and the inter prediction mode may be determined according to the characteristics of the target feature map. When the intra prediction mode is selected, the reference feature map may be a specific block inside the target feature map, and when the inter prediction mode is selected, the reference feature map may be another feature map having the same size as the target feature map.

Figure 3:
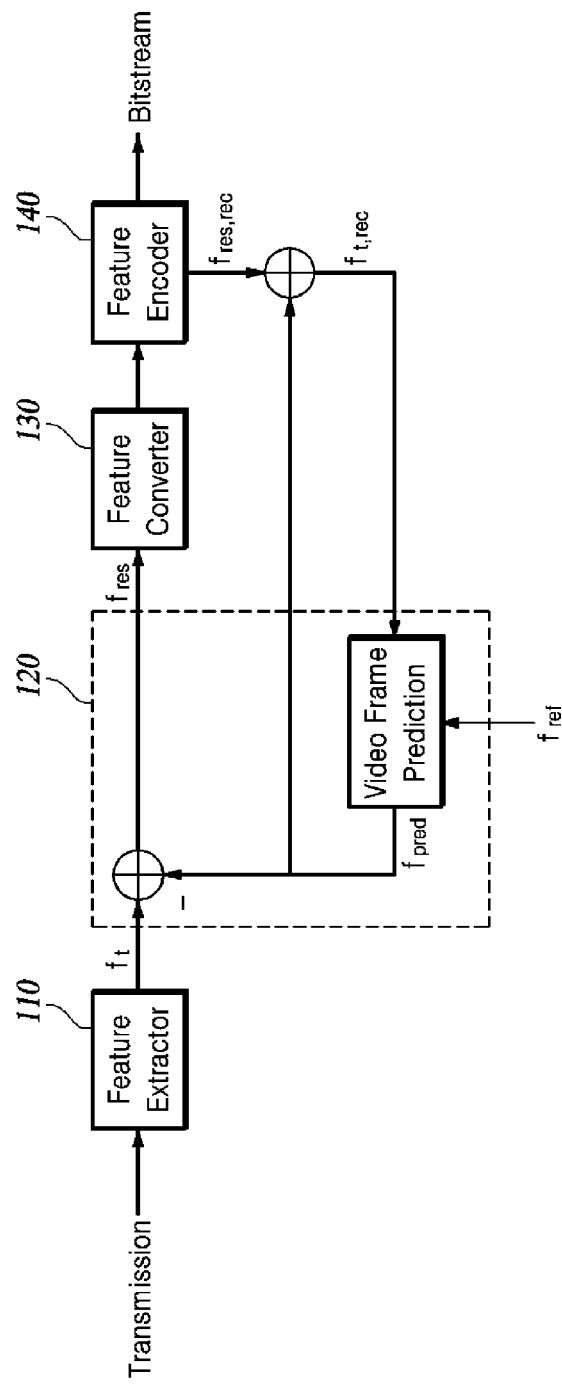
FIG. 3 is a block diagram of a feature map prediction operation in a VCM encoder, according to at least one embodiment of the present disclosure.

FIG. 3 is a block diagram of a feature map prediction operation in a VCM encoder, according to at least one embodiment of the present disclosure.

Figure 4:
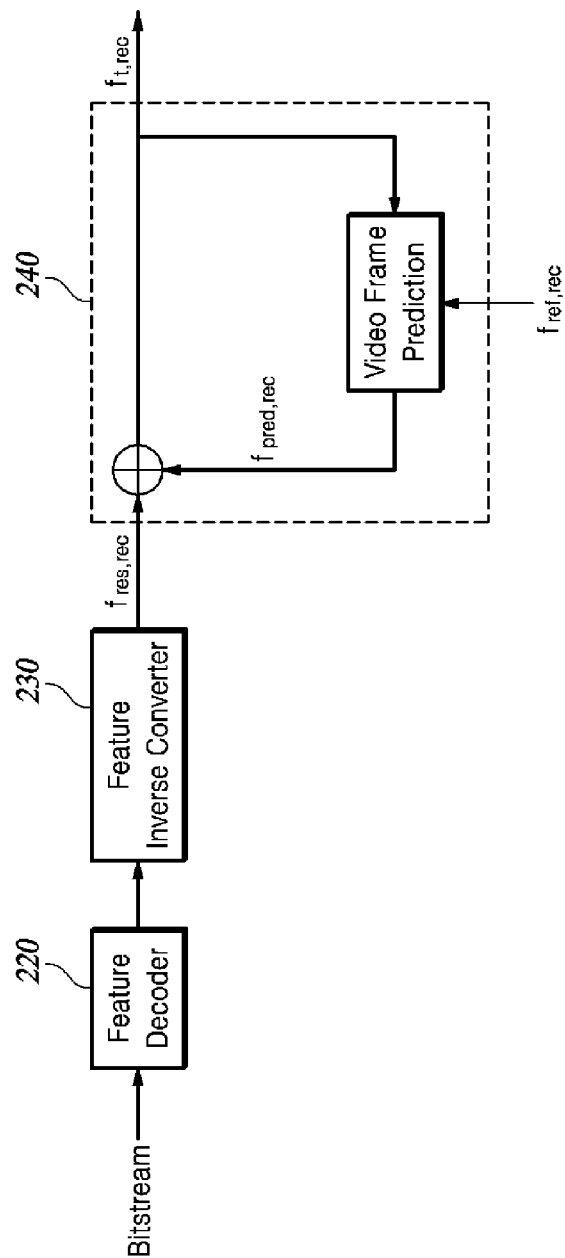
FIG. 4 is a block diagram of a feature map prediction operation in a VCM decoder, according to at least one embodiment of the present disclosure.

FIG. 4 is a block diagram of a feature map prediction operation in a VCM decoder, according to at least one embodiment of the present disclosure.

FIGS. 3 and 4 leave out illustrations of the video encoding and video decoding processes of the input image performed by the video encoder 150 and the video decoder 250.

As shown in FIG. 3, the feature extractor 110 in the VCM encoder extracts target feature map $f_t$ from the input image. The feature predictor 120 takes a video frame prediction method using target feature map $f_t$ and reference feature map $f_{ref}$ as inputs, to generate predicted feature map $f_{pred}$. The feature predictor 120 subtracts predicted feature map $f_{pred}$ from original target feature map $f_t$ to generate residual feature map $f_{res}$ corresponding to the difference between the original target feature map and the predicted feature map. Residual feature map $f_{res}$ is converted by the feature converter 130, encoded into a bitstream by the feature encoder 140, and then transmitted to the VCM decoder.

FIG. 3 illustrates that the feature encoder 140 may include a decoding path and may use the same to generate a reconstructed residual feature map $f_{res,rec}$. The VCM encoder may generate the reconstructed feature map $f_{t,rec}$ by adding the reconstructed residual feature map $f_{res,rec}$ and the predicted feature map $f_{pred}$. At a later time, as in the existing video frame prediction method, reconstructed feature map $f_{t,rec}$ may be used as reference feature map $f_{ref}$.

In FIG. 4, the VCM decoder applies the received bitstream to the feature decoder 220 and the feature inverse converter 230 to generate reconstructed residual feature map $f_{res,rec}$. The feature predictor 240 utilizes reconstructed reference feature map $f_{ref,rec}$ to generate reconstructed predicted feature map $f_{pred,rec}$, and then sums reconstructed residual feature map $f_{res,rec}$ and reconstructed predicted feature map $f_{pred,rec}$ to reconstruct target feature map $f_{t,rec}$.

At a later time, as in the existing video frame prediction method, the reconstructed feature map $f_{t,rec}$ may be used as the reconstructed reference feature map $f_{ref,rec}$.

Machine vision data represented by a feature map generated by a deep learning network has a form different from that of a general image. On the other hand, the existing video prediction method using a video as an input assumes the presence of a spatial correlation to perform the intra prediction mode and assumes the presence of a temporal correlation to perform the inter prediction. Such an existing video prediction method may be unable to perform optimal prediction on machine vision data having characteristics different from those of a general image. Accordingly, it may be inappropriate to use some encoding modules provided by existing video codecs such as HEVC and VVC. For example, when using a transform skip mode, a discrete cosine transform (DCT) may not be used. On the other hand, some other encoding modules may be allowed. For example, modules such as Residual Differential Pulse Code Modulation (RDPCM) encoding, a palette in a 4:4:4 video signal format, and intra block copy may be used.

To overcome the shortcomings of the existing video prediction method using the general image characteristics as described above, the present disclosure in some embodiments uses a prediction method that is based on a deep learning-based feature map predictive model (hereinafter 'predictive model'). The predictive model can present better predictive performance than the existing video prediction method by using the output feature map generated by the predictive model as a basis for learning the correlation between the target feature map and the reference feature map.

Figure 5:
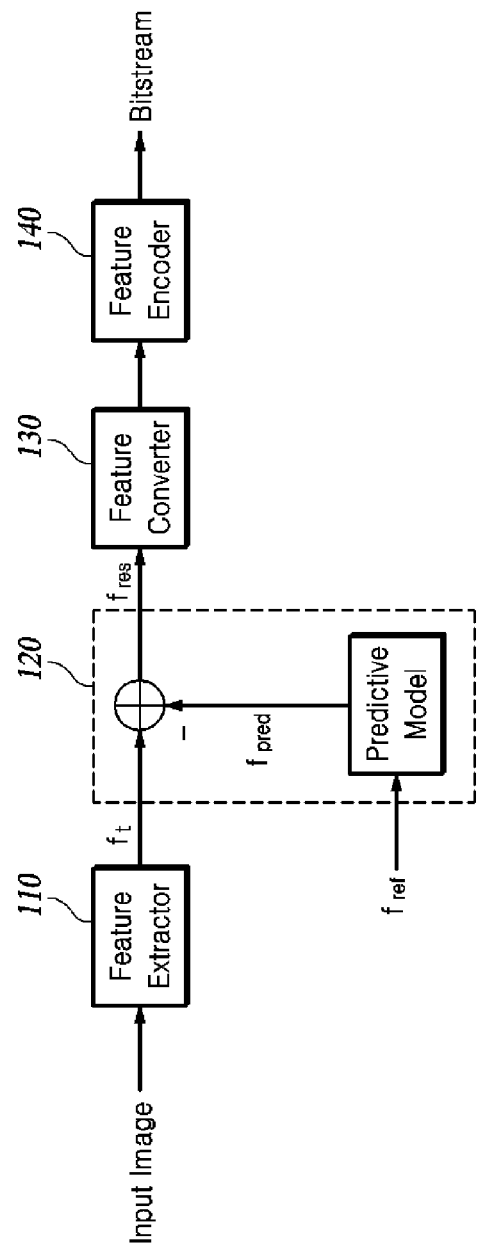
FIG. 5 is a block diagram of a feature map prediction architecture in a VCM encoder, according to another embodiment of the present disclosure.

FIG. 5 is a block diagram of a feature map prediction architecture in a VCM encoder, according to another embodiment of the present disclosure.

Figure 6:
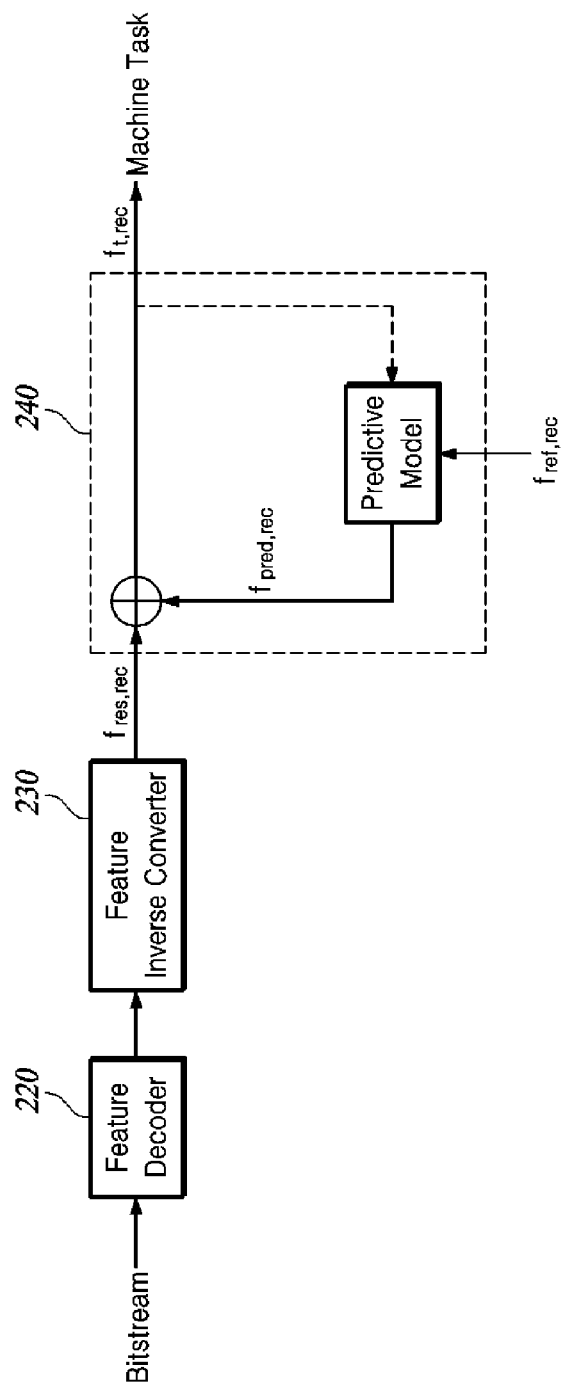
FIG. 6 is a block diagram of a feature map prediction architecture in a VCM decoder, according to yet another embodiment of the present disclosure.

FIG. 6 is a block diagram of a feature map prediction architecture in a VCM decoder, according to yet another embodiment of the present disclosure.

FIGS. 5 and 6 are merely exemplary and may be modified into various structures according to the purpose. FIGS. 5 and 6 leave out illustrations of the encoding and decoding processes of the input image performed by the video encoder 150 and the video decoder 250.

As shown in FIG. 5, the feature predictor 120 utilizes the predictive model to generate, from reference feature map $f_{ref}$, predicted feature map $f_{pred}$ having the same size as the target feature map. The feature predictor 120 obtains residual feature map $f_{res}$ corresponding to the difference between original target feature map $f_t$ and predicted feature map $f_{pred}$. Residual feature map $f_{res}$ is converted by the feature converter 130, encoded into a bitstream by the feature encoder 140, and then transmitted to the VCM decoder.

In FIG. 6, the VCM decoder applies the received bitstream to the feature decoder 220 and the feature inverse converter 230 to generate reconstructed residual feature map $f_{res,rec}$. The feature predictor 240 utilizes the predictive model to generate, from reconstructed reference feature map $f_{ref,rec}$, the reconstructed predicted feature map $f_{pred,rec}$, and then sums reconstructed residual feature map $f_{res,rec}$ and reconstructed predicted feature map $f_{pred,rec}$ and thereby reconstructs target feature $f_{t,rec}$.

At a later time, as in the existing video frame prediction method, reconstructed feature map $f_{t,rec}$ may be used as reconstructed reference feature map $f_{ref,rec}$.

For a prediction method using a predictive model as shown in FIGS. 5 and 6, a method of selecting a reference feature map will be described below.

On the other hand, the predictive model may be trained alone by the training unit, or it may be trained end-to-end along with a deep learning model that is in the feature extractor 110 and performs feature map extraction and machine task and with a deep learning model that is in the feature encoder 140 and performs feature map encoding.

When the predictive model is trained alone, the loss function may be expressed as in Equation 1.

$$L = L_2(f_{pred}, f_t) + \lambda_1 L_1(f_{res}) + \lambda_2 L_2(f_t, f_{t,rec}) \quad \text{Equation 1}$$

Here, the first term is the L2 loss which is a loss for promoting predicted feature map $f_{pred}$ predicted from reference feature map $f_{ref}$ to better predict target feature map $f_t$. The second term is the L1 loss which is a loss for reducing the number of bits of the actual transmitted residual feature map $f_{res}$. The third term is the L2 loss which is a loss for reducing the difference between the reconstructed target feature map outputted from the VCM decoder and the original feature map (i.e., the target feature map). $\lambda_1$ and $\lambda_2$ are hyperparameters for adjusting the effect of the relevant loss during learning.

When the predictive model is trained end-to-end along with the machine task model for performing feature map extraction and machine task, the loss function may be expressed as Equation 2.

$$L = L_T + \lambda_1 L_E + \lambda_2 L_2(f_{pred}, f_t) + \lambda_3 L_1(f_{res}) \quad \text{Equation 2}$$

Here, the first term, $L_T$, is a loss commonly used for a task, and the second term, $L_E$, is a loss used when feature map coding is learning-based. The third and fourth terms are used for the same purpose as in Equation 1. $\lambda_1$ to $\lambda_3$ are hyperparameters for adjusting the effect of the relevant loss during learning.

Meanwhile, the VCM encoder shares the parameters of the trained predictive model with the VCM decoder. Additionally, when the parameters of the predictive model are updated, the VCM encoder may transmit the updated parameters to the VCM decoder.

The following describes a method of selecting a reference feature map, used by the feature predictor 120 in the VCM encoder and the feature predictor 240 in the VCM decoder according to scenarios that can be utilized by the present disclosure.

Scenarios that can be utilized by the present disclosure are situations in which, for a target feature map to be transmitted, a reference feature map exists having a high correlation with the target feature map and can be encoded and decoded. As mentioned above, these scenarios include cases: with respect to a video input, where machine vision data is temporally and spatially correlated; where a system for machine vision performs multiple machine vision tasks with machine vision data of respective tasks holding correlation therebetween; and where there is a correlation between machine vision data according to the model architectures that perform a machine vision task. Accordingly, the correlation between the target feature map and the reference feature map may be classified in terms of time and space, task, and architecture of the machine task model.

In general, the channel of the output feature map of the deep learning model is deeper than that of the general image. In this case, the positions of the channels of the output feature maps are the same, and other channels may have the same aspect of correlation as well.

As a first example, when the input of the machine task model is a video, a temporal correlation exists between frames constituting the video. When all frames are applied to the same machine task model, a temporal correlation may be maintained also between output feature maps corresponding to each frame. Accordingly, the machine vision system may set the output feature map of a specific frame as the reference feature map and then may predict the output feature maps of the remaining frames based on the reference feature map.

Additionally, outputting a feature map of a relatively shallow layer of the machine task model with respect to one input image may further maintain spatial correlation within the image. Accordingly, the machine vision system may set a sub-block in the output feature map as a reference block, and then predict the remaining blocks in the output feature map based on the reference block.

As another example, when multiple tasks are performed on an input image, a correlation exists between output feature maps corresponding to the plurality of tasks even with the use of dedicated models to individual tasks for performing the respective tasks. For an input image in which a large number of people appear, an image segmentation model outputs a feature map having a large value centered on the people. With the same image, the face recognition model outputs a feature map having a particularly large value given to the face region of people, while still having a large value given to the segmented region of the people compared to that of the background.

For example, the machine vision system may set the output feature map of the image segmentation model as the reference feature map and then turn to the face recognition task for predicting, from this reference feature map, the output feature map of the face recognition model to generate a predicted feature map. Additionally, the machine vision system may transmit only the residual feature map corresponding to the difference between the predicted feature map and the original feature map. In this case, the residual feature map may maintain only the values in the face region leaving out the human region except for the face.

As yet another example, a single deep learning model holds a correlation existing between output feature maps for the respective layers of the deep learning model. A common deep learning model includes a continuous layered structure and reduces the size of the feature map while passing it through the pooling layers to output coarse feature maps. Nevertheless, the feature map of the deep layer still preserves the characteristics of the feature map of the shallow layer because it is a result of the previously existing feature map of the shallow layer passing through a plurality of intermediate layers. Accordingly, the machine vision system may select a feature map of a shallow layer as a reference feature map and predict an output feature map of a deep layer based on the reference feature map.

Additionally, since these scenarios are not mutually independent, when the vision system repeatedly performs several scenarios, it can simultaneously perform the prediction of a plurality of feature maps to maximize encoding efficiency.

The following describes the architectures of a VCM encoder and a VCM decoder that can be used for the respective scenarios. In this case, the VCM encoder and the VCM decoder may use one of the above-described various prediction methods as the feature map prediction method.

As described above, when inputting a video input, that is, a plurality of frames having strong spatial and temporal correlations to the same machine task model, output feature maps too hold their close spatial and temporal correlations. Hereinafter, a VCM encoder and a VCM decoder will be described by architectures that can be configured based on such correlations.

Figure 7:
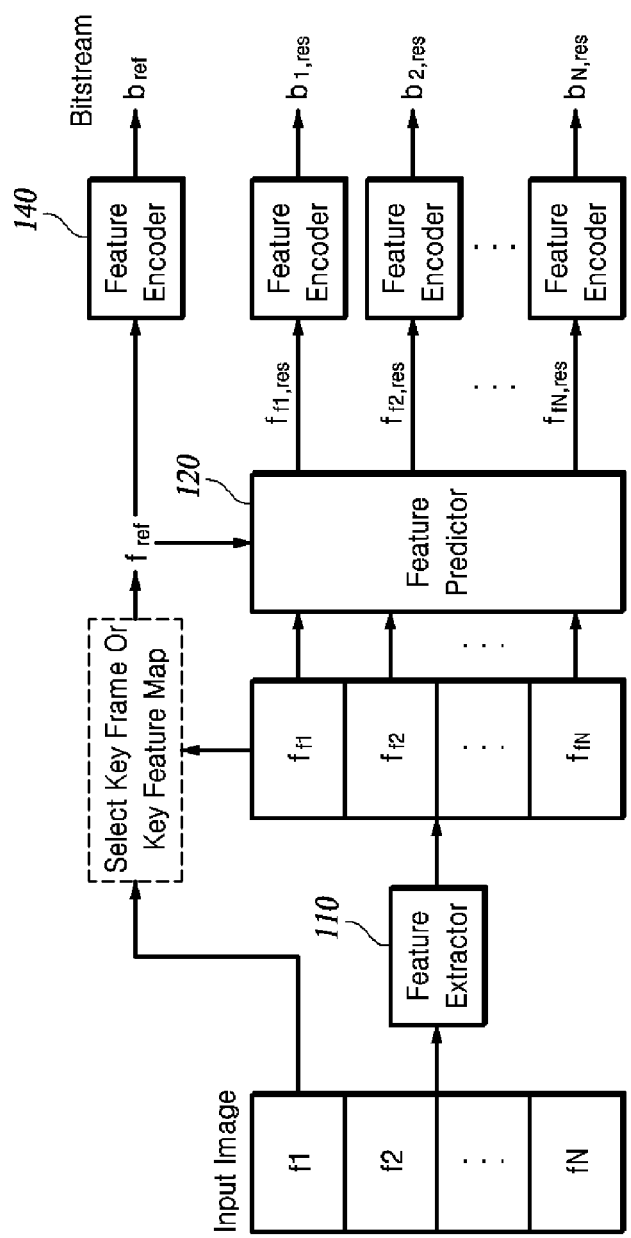
FIG. 7 is a block diagram of a VCM encoder using a key feature map, according to at least one embodiment of the present disclosure.

FIG. 7 is a block diagram of a VCM encoder using a key feature map, according to at least one embodiment of the present disclosure.

The VCM encoder sets as a key feature map the most representative feature map among the feature maps outputted by the feature extractor 110 from video frames and then uses the key feature map as a reference feature map. The VCM encoder may select a key feature map from among the feature maps extracted by the feature extractor 110 in terms of bit rate distortion optimization. As another embodiment, the VCM encoder may select a key frame from among video frames in terms of bit rate distortion optimization. Additionally, the feature extractor 110 extracts, from the remaining frames, an original feature map of each of the remaining frames.

In the VCM encoder, the feature predictor 120 may perform prediction based on the reference feature map selected for each of the original feature maps of the remaining frames to generate a predicted feature map. The feature predictor 120 may subtract, from each of the original feature maps of the remaining frames, the corresponding predicted feature map to generate a residual feature map. As illustrated in FIG. 7, the feature encoder 140 encodes the reference feature map of the key frame, encodes the residual feature maps of the remaining frames, generates a bitstream, and then transmits the generated bitstream to the VCM decoder.

The VCM encoder may encode the residual feature maps of the remaining frames and thereby improve encoding efficiency.

Meanwhile, the feature predictor 120 may set the reference feature map immediately as the predicted feature map as a method of generating the predicted feature map. As another method, the feature predictor 120 may generate a predicted feature map by performing inter-prediction based on the reference feature map. As yet another method, the feature predictor 120 may utilize a deep learning-based predictive model for generating a predicted feature map from the reference feature map.

In the VCM decoder, the feature decoder 220 decodes the reference feature map of the key frame from the bitstream and decodes the residual feature maps of the remaining frames. The feature predictor 240 may perform prediction on each of the remaining frames based on the reconstructed reference feature map to generate a predicted feature map. The feature predictor 240 may sum the reconstructed residual feature maps of the remaining frames and the corresponding predicted feature maps to generate reconstructed feature maps. In this case, to generate the predicted feature map, the feature predictor 240 may use one of the prediction methods applied to the VCM encoder shown in FIG. 7.

The following describes a method of encoding the reference feature map of the key frame.

First, the VCM encoder may encode the reference feature map without using spatial information of the input image.

In some embodiments, the VCM encoder uses spatial information of the input image. As described above, since the output feature map of the shallow layer of the machine task model preserves the form of the input frame relatively well, it can also preserve spatial information of the input image. As such, when the spatial correlation is largely maintained within a single feature map, with respect to the feature map outputted by the feature extractor 110, the VCM encoder may set a neighboring block of a subblock to be transmitted as a reference block. The feature predictor 120 may predict the feature map of the transport block from the feature map of the reference block to generate a feature map of a prediction block. The feature predictor 120 subtracts the prediction block from the transport block to generate a feature map of the residual block. The VCM encoder may encode the feature map of the residual block to generate and then transmit a bitstream to the VCM encoder. In this case, the feature predictor 120 may use an intra prediction of video coding or a deep learning-based block prediction model as a prediction method.

The feature decoder 220 in the VCM decoder decodes the feature map of the residual block from the bitstream. The feature predictor 240 may perform prediction based on the feature map of the reconstructed reference block to generate a feature map of the prediction block. The feature predictor 240 may add the prediction block to the reconstructed residual block to generate a reconstructed block. Thereafter, the reconstructed block may be used as a reconstruction reference block.

By applying the aforementioned prediction method using the reference block to the reference feature map of the key frame, the VCM encoder can improve the efficiency of encoding the reference feature map of the key frame.

Meanwhile, when the task system performs a plurality of tasks, a main task may be selected by measuring the task affinity between the tasks. Additionally, the remaining tasks may be called subtasks.

The affinity between tasks may be measured from an affinity matrix indicating transferability between two tasks. Here, the transferability between the two tasks represents the level of performance improvement between performing ex-post learning of the target task by applying just the feature representation of the neural network model trained with the source task to the target task and performing individual learning of the target task.

On the other hand, when the task affinity is strong between the subtasks and the main task, two models learn similar feature maps even if the two are different. Accordingly, the feature map may be predicted based on this form of correlation between tasks.

When the correlation between tasks is significant, it is suitable to use a deep learning-based predictive model instead of an ordinary prediction method in a video codec. For example, by inputting the output feature map of the image segmentation model to the deep learning model of the autoencoder architecture, it can be trained to output the output feature map of the face recognition model. Therefore, such a deep learning model of an autoencoder architecture may be used as a feature map predictive model.

Figure 8:
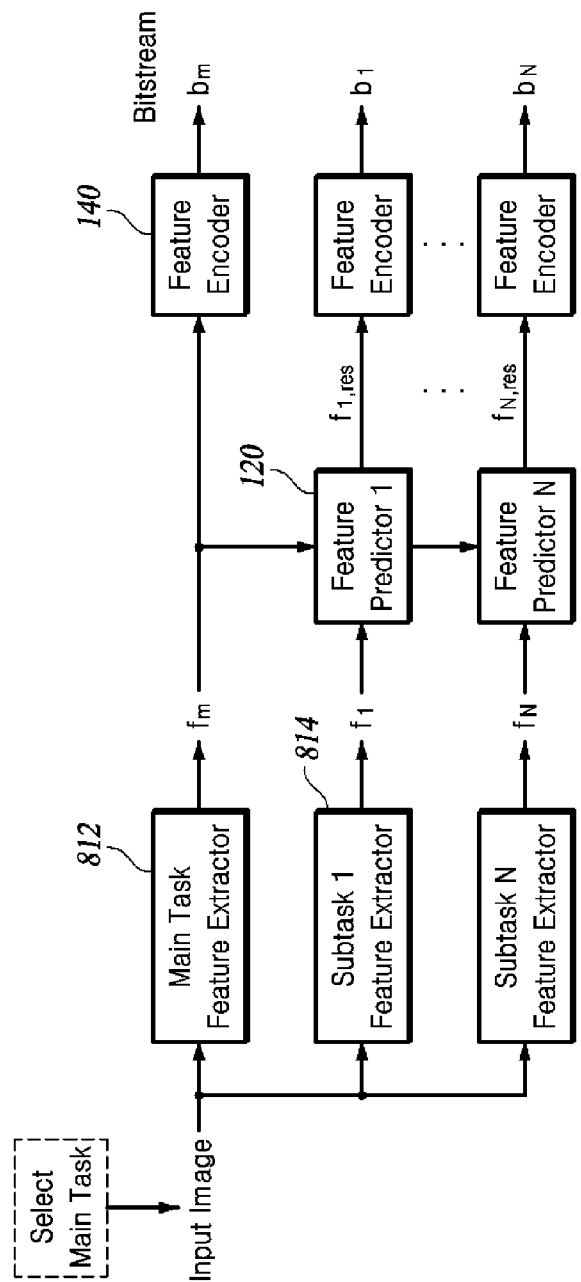
FIG. 8 is a block diagram of a VCM encoder for performing a plurality of tasks sharing affinity, according to yet another embodiment of the present disclosure.

FIG. 8 is a block diagram of a VCM encoder for performing a plurality of tasks sharing affinity, according to yet another embodiment of the present disclosure.

To extract feature maps of target tasks, the VCM encoder includes a main task feature extractor 812 and a plurality of subtask feature extractors 814.

The VCM encoder measures the task affinity between target tasks and sets the task having the highest task affinity with respect to other tasks as the main task.

The main task feature extractor 812 extracts a feature map from the main task. The VCM encoder may set the extracted feature map as a reference feature map for the remaining subtasks. The feature encoder 140 encodes the feature map of the main task. Here, the VCM encoder may encode the feature map of the main task without using the feature predictor 120. As yet another embodiment, the VCM encoder may encode the feature map of the main task by using the reference feature map of the key feature map, the reference block, or a combination thereof, as shown in FIG. 7.

The subtask feature extractors 814 each extract the original feature map of each of the subtasks from the subtasks. Meanwhile, the main task feature extractor 812 and the plurality of subtask feature extractors 814 include the same deep learning-based machine task model, and they can use the same model to extract feature maps of the main task and subtasks.

The feature predictor 120 may perform prediction based on the reference feature map to generate predicted feature maps of subtasks. The feature predictor 120 may subtract, from the original feature maps of the subtasks, the corresponding predicted feature maps to generate residual feature maps, respectively. In this case, the feature predictor 120 may use the aforementioned deep learning-based predictive model for generating the predicted feature maps from the reference feature map. As illustrated in FIG. 8, the feature encoder 140 encodes the residual feature maps of the subtasks to generate a bitstream and then transmits the generated bitstream to the VCM decoder. The VCM encoder can improve the encoding efficiency by transmitting the bitstream obtained by encoding the residual feature maps of subtasks.

The feature decoder 220 in the VCM decoder decodes the feature map of the main task from the bitstream and sets the decoded feature map as a reconstructed reference feature map. Here, when the feature map of the main task is encoded with no feature map prediction used, the VCM encoder may decode the feature map of the main task without involving the feature predictor 240. As yet another embodiment, the VCM decoder may decode the feature map of the main task by using the reference feature map, the reference block, or a combination thereof of the key feature map.

The feature decoder 220 decodes the residual feature maps of subtasks from the bitstream. The feature predictor 240 may perform prediction for each of the subtasks based on the reconstruction reference feature map to generate a predicted feature map. Here, the feature predictor 240 may use the aforementioned deep learning-based predictive model to generate a predicted feature map from the reference feature map. The feature predictor 240 may sum the reconstructed residual feature maps of the subtasks and the corresponding predicted feature maps to generate reconstructed feature maps.

On the other hand, with a task having no significant task affinity with the main task, the VCM encoding/decoding apparatus may encode/decode the feature map of that task with no feature map prediction used. As yet another embodiment, the VCM encoding/decoding apparatus may use the reference feature map of the key feature map as shown in FIG. 7 or use a reference block to encode/decode the feature map of the task having no significant task affinity.

In general, depending on which layer of the machine task model to transmit as the resultant feature map, transmission bits and task performance may vary. When using lossy compression of the feature map, it is common that the closer a deep layer to the output end that meets the task purpose is to transmit the feature map, the less the task performance degradation shows due to encoding. On the other hand, for the machine task model to learn sophisticated feature maps required for a task, the machine task model needs to be designed so that the closer it gets to the output end, the more channels included in the feature map for the machine task model to output. Therefore, with such a machine task model, the number of bits to be transmitted may increase.

The machine vision system needs to transmit the output feature map of the deepest transmittable layer based on the number of useful bits in terms of encoding efficiency. However, in contrast to the case of transmitting the feature map of the final output layer, it is supposed to tolerate a decrease in task performance.

For example, it is assumed that the intermediate feature map of the task model is already transmitted based on the number of initial utility bits, resulting in performance degradation. In this case, as the number of useful bits increases, the machine vision system may recover the performance degradation by transmitting the output feature map of a layer deeper than the existing layer based on the increased number of useful bits.

In particular, when the machine task model has a continuous structure, there exists a correlation according to the network structure between the intermediate layer and a deeper layer. Therefore, the machine vision system may set the output feature map of the intermediate layer as the reference feature map, and then predict the output feature map of the deeper layer based on the reference feature map to generate the predicted feature map. Thereafter, the machine vision system may subtract the predicted feature map from the output feature map of the deeper layer to generate a residual feature map and then transmit only the residual feature map. By using such an efficient coding method, a feature map of a deeper layer than the conventional one may be selected and then transmitted.

Figure 9:
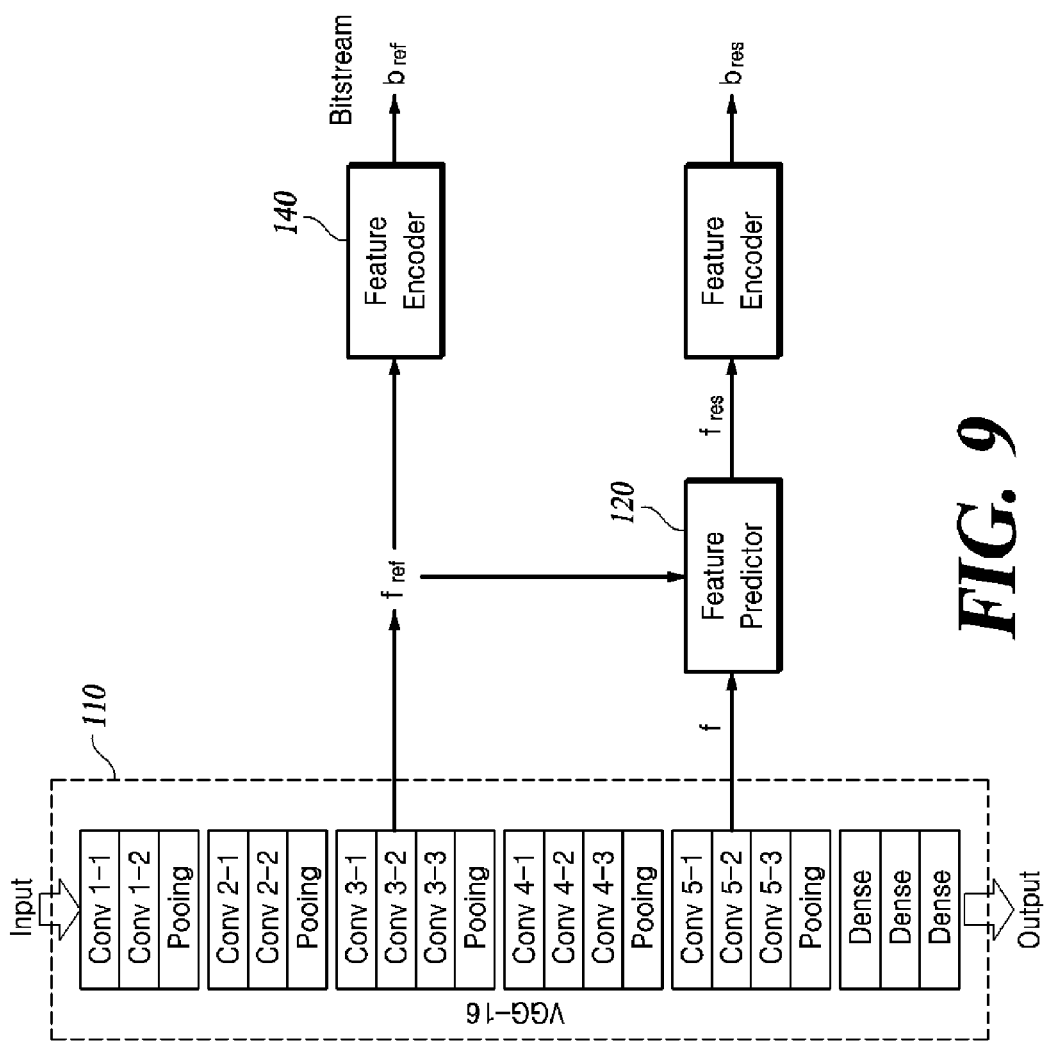
FIG. 9 is a block diagram of a VCM encoder based on an architecture of a machine task model, according to yet another embodiment of the present disclosure.

FIG. 9 is a block diagram of a VCM encoder based on an architecture of a machine task model, according to yet another embodiment of the present disclosure.

In the illustration of FIG. 9, as a machine task model, a VGG16 model is used in which 16 layers are interconnected (reference can be made to the document titled "Very Deep Convolutional Networks for Large-Scale Image Recognition" of arXiv:1409.1556).

Where the number of useful bits is small, the VCM encoder extracts, encodes, and transmits the output feature map of the convolution layer 3-2 (Cony 3-2) of VGG16 to a VCM decoder. After decoding the feature map, the VCM decoder may perform a machine task by inputting the reconstructed feature map to Cony 3-3 of VGG16. A feature map of a relatively shallow layer is encoded/decoded possibly leading to an error in a transmission process, which may further decrease the task performance.

On the other hand, when the number of useful bits increases and the output feature map of a deeper convolutional layer 5-2 (Cony 5-2) may be transmitted, the feature predictor 120 in the VCM encoder map generate a predicted feature map by using the output feature map of the previously transmitted Cony 3-2 as a reference feature map. For example, as described above, the feature predictor 120 may use a deep learning-based predictive model to generate a predicted feature map from the reference feature map. Thereafter, the feature predictor 120 may subtract the predicted feature map from the output feature map of Cony 5-2 to generate a residual feature map. The feature encoder 140 may encode only the residual feature map within the increased number of useful bits to generate a bitstream, and then transmit the bitstream to the VCM decoder.

The feature decoder 220 decodes the residual feature map from the bitstream. The feature predictor 240 may add the reconstructed residual feature map to the already reconstructed reference feature map (reconstructed output feature map of Cony 3-2), thereby improving the output feature map of Cony 5-2.

As yet another embodiment, the feature predictor 240 may perform prediction based on the reconstructed reference feature map to generate a predicted feature map, and then sum the reconstructed residual feature map and the predicted feature map to generate a reconstructed feature map.

Thereafter, the VCM decoder performs a machine task by using the improved output feature map as a new input to Cony 5-3 of the machine task model VGG16, which can recover task performance.

In this case, available prediction methods include an inter-band prediction method of JPEG2000, a method using a deep learning-based predictive model, and the like. When using a deep learning-based predictive model, as described above, feature map extraction and feature map prediction may be learned together end-to-end, or feature map extraction and feature map prediction may be individually learned.

As described above, according to some embodiment of the present disclosure, the VCM coding apparatus and method capable of implementing various feature map prediction architectures can be applied to various scenarios according to the correlation of machine vision data. In particular, the VCM coder uses a plurality of feature map prediction methods so as to be suitable for scenarios that may occur redundantly, thereby maximizing encoding efficiency from a machine vision point of view.

Figure 10:
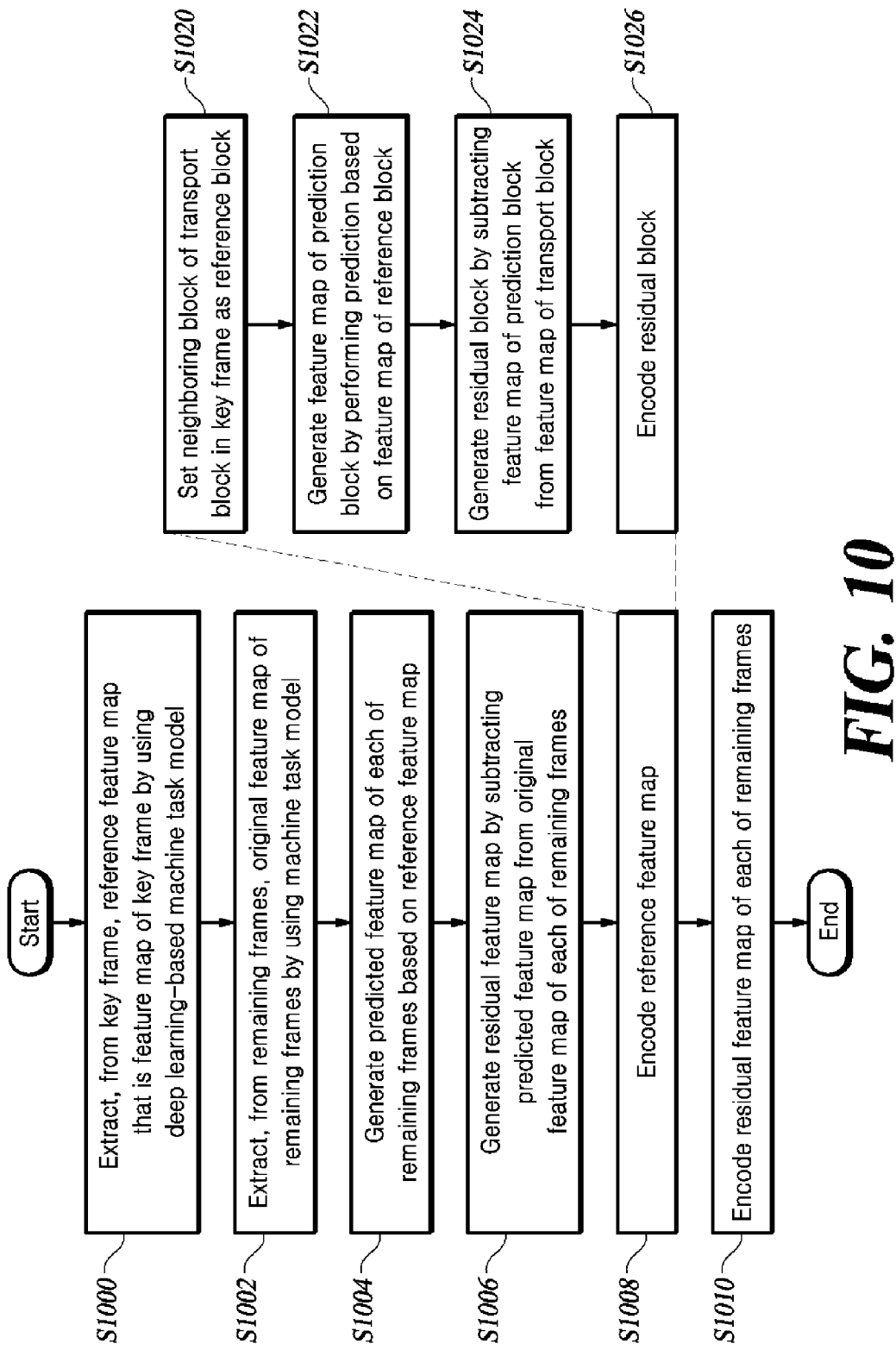
FIG. 10 is a flowchart of a VCM encoding method using a key feature map, according to at least one embodiment of the present disclosure.
Figure 11:
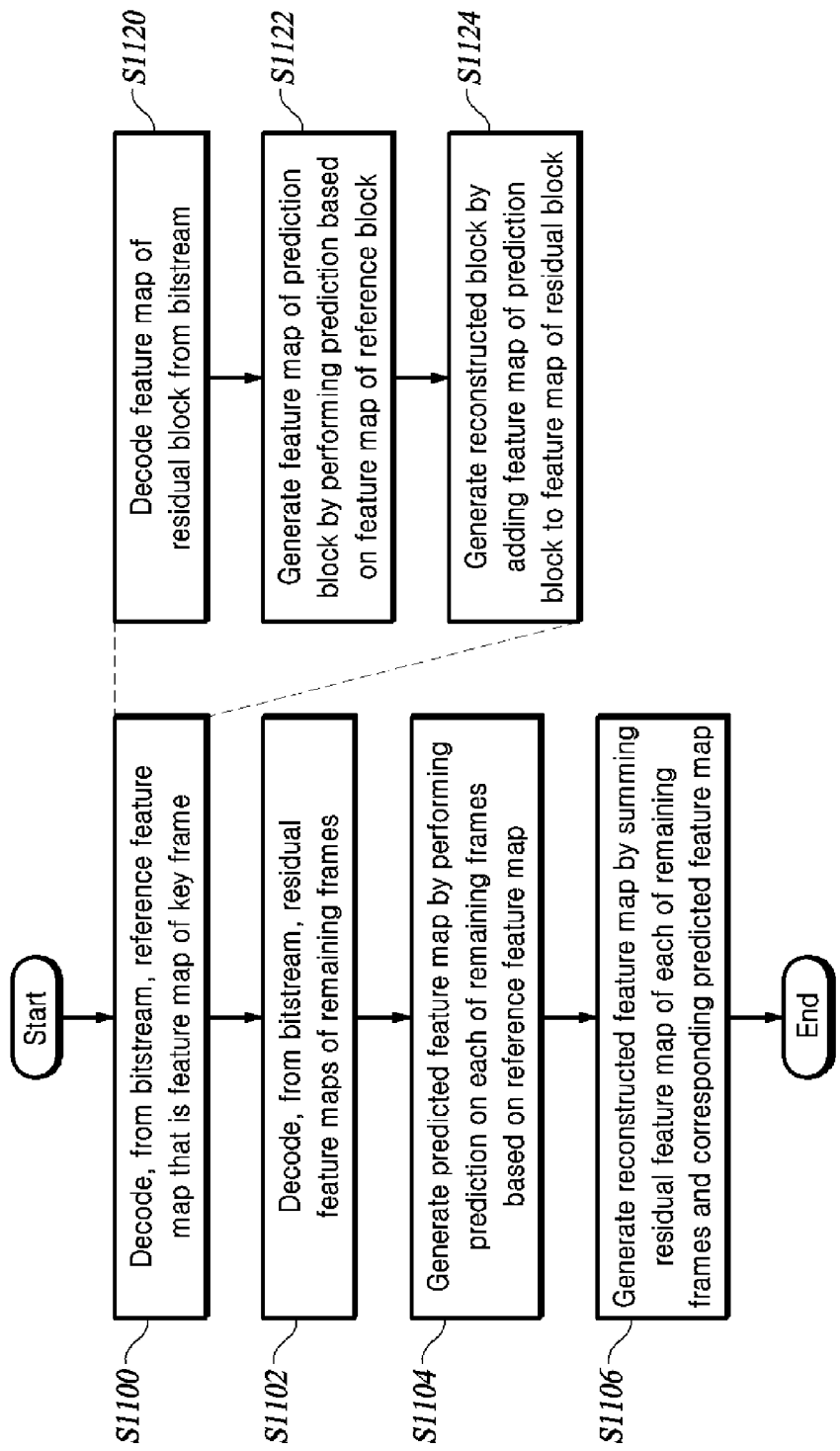
FIG. 11 is a flowchart of a VCM decoding method using a key feature map, according to at least one embodiment of the present disclosure.

The following describes a VCM encoding method and a VCM decoder using a key feature map that is a feature map of a key frame among video frames by referring to FIGS. 10 and 11.

FIG. 10 is a flowchart of a VCM encoding method using a key feature map, according to at least one embodiment of the present disclosure.

The VCM encoder extracts, from a key frame, a reference feature map that is a feature map of the key frame by using a deep learning-based machine task model (S1000). The VCM encoder sets, as the key feature map, the most representative feature map among the feature maps outputted by the machine task model from video frames and then uses the key feature map as a reference feature map.

The VCM encoder may select a key feature map from among feature maps extracted by the machine task model in terms of bit rate distortion optimization. As yet another embodiment, the VCM encoder may select a key frame from among the video frames in terms of bit rate distortion optimization.

The VCM encoder extracts, from the remaining frames after the key feature map, an original feature map of each of the remaining frames by using the machine task model (S1002).

The VCM encoder generates a predicted feature map of each of the remaining frames based on the reference feature map (S1004).

The VCM encoder may set just the reference feature map as the predicted feature map as a method of generating the predicted feature map. As yet another method, the VCM encoder may perform inter prediction based on the reference feature map to generate a predicted feature map. As yet another method, the VCM encoder may generate a predicted feature map from the reference feature map by using a deep learning-based predictive model.

The VCM encoder generates a residual feature map by subtracting the predicted feature map from the original feature map of each of the remaining frames (S1006).

The VCM encoder encodes the reference feature map (S1008).

The VCM encoder encodes the residual feature map of each of the remaining frames (S1010).

The VCM encoder may encode the reference feature map and the residual feature map of each of the remaining frames to generate a bitstream, and then transmit the latter to the VCM decoder.

The following details Step S1008 of the VCM encoder encoding the reference feature map.

First, the VCM encoder may encode the reference feature map without using spatial information of the input image.

As yet another embodiment, the VCM encoder may encode the reference feature map by using spatial information of the input image as follows.

The VCM encoder sets the neighboring block of the transport block in the key frame as the reference block (S1020).

The VCM encoder generates a feature map of a prediction block by performing prediction based on the feature map of the reference block (S1022). The VCM encoder may use an intra prediction of video coding or use a deep learning-based block prediction model as a method for generating a feature map of a prediction block.

The VCM encoder generates a residual block by subtracting the feature map of the prediction block from the feature map of the transport block (S1024).

The VCM encoder encodes the residual block (S1026). The VCM encoder generates a bitstream by encoding the residual block corresponding to the transport block, and then transmits the generated bitstream to the VCM decoder.

FIG. 11 is a flowchart of a VCM decoding method using a key feature map, according to at least one embodiment of the present disclosure.

The VCM decoder decodes, from the bitstream, a reference feature map that is a feature map of a key frame among video frames (S1100).

As described above, a key frame is a frame representing video frames in terms of bit rate distortion optimization and is selected by the VCM encoder.

The VCM decoder decodes, from the bitstream, the residual feature maps of the remaining frames besides the key frame (S1102).

The VCM decoder generates a predicted feature map by performing a prediction on each of the remaining frames based on the reference feature map (S1104). The VCM decoder may use one of the above-described prediction methods to generate the predicted feature map.

The VCM decoder generates a reconstructed feature map by summing the residual feature map of each of the remaining frames and the corresponding predicted feature map (S1106).

The following details Step S1100 of the VCM decoder decoding the reference feature map.

First, when the reference feature map is encoded by the VCM encoder without using spatial information of the key frame, the VCM decoder may also decode the reference feature map without using spatial information.

As yet another embodiment, when the reference feature map is encoded by the VCM encoder by using spatial information of the key frame, the VCM decoder may decode the reference feature map by using the spatial information of the key frame as follows.

The VCM decoder decodes the feature map of the residual block from the bitstream (S1120). Here, the residual block is a block transmitted by the VCM encoder and corresponding to the transport block in the key frame.

The VCM decoder generates a feature map of the prediction block by performing prediction based on the feature map of the reference block (S1122). The VCM decoder may use an intra prediction of video coding or use a deep learning-based block prediction model as a method of generating a feature map of a prediction block.

The VCM decoder generates a reconstructed block by adding the feature map of the prediction block to the feature map of the residual block (S1124). Thereafter, the reconstructed block may be used as a reference block.

Hereinafter, a VCM encoding method and a VCM decoding method using the feature maps of the main task and the subtasks will be described using the flowcharts of FIGS. 12 and 13.

Figure 12:
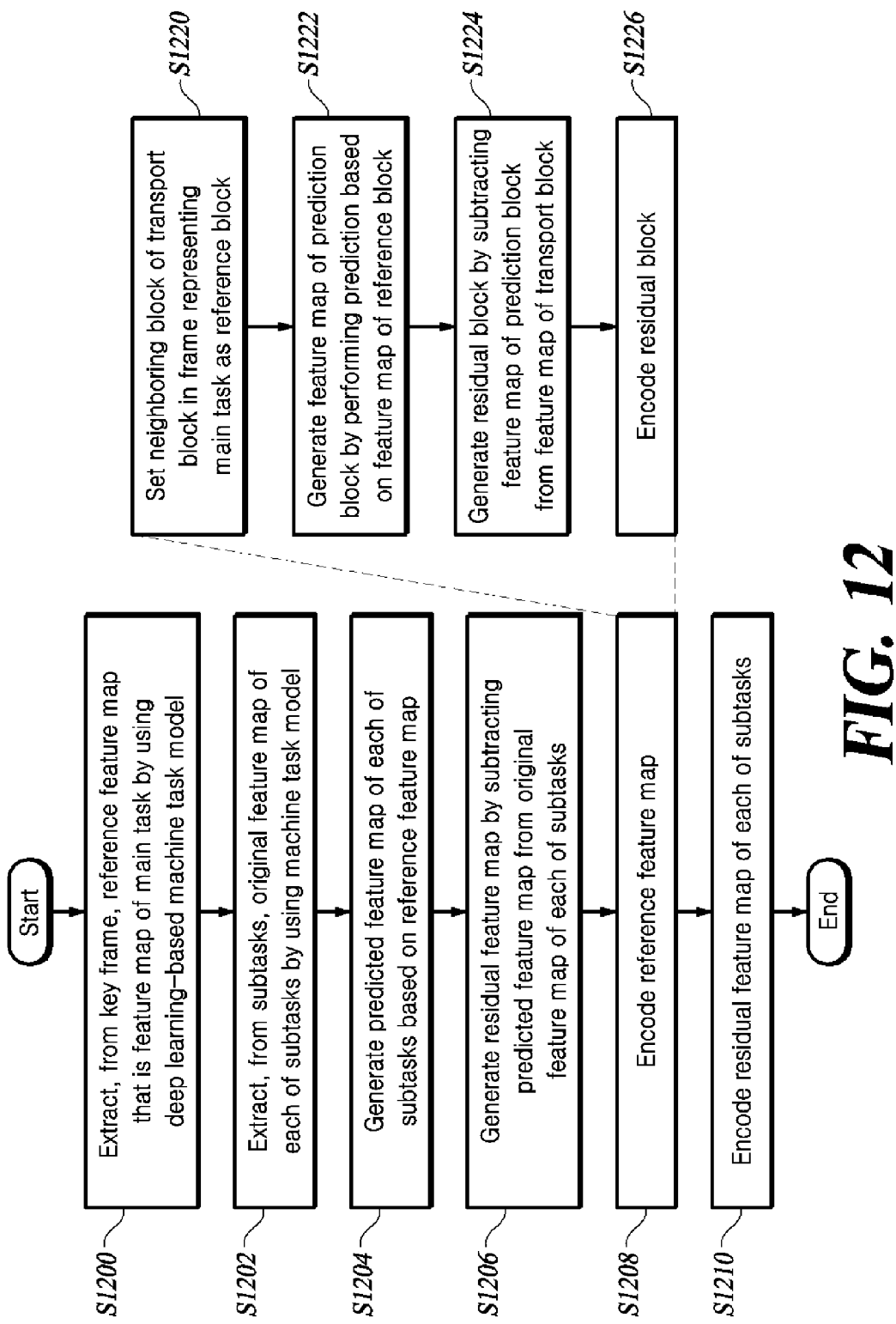
FIG. 12 is a flowchart of a VCM encoding method for performing a plurality of tasks sharing affinity, according to yet another embodiment of the present disclosure.

FIG. 12 is a flowchart of a VCM encoding method for performing a plurality of tasks sharing affinity, according to yet another embodiment of the present disclosure.

The VCM encoder extracts a reference feature map that is a feature map of the main task by using a deep learning-based machine task model (S1200). The VCM encoder measures the task affinity between target tasks, selects the task having the highest task affinity with respect to other tasks as the main task, and sets the unselected remaining tasks as subtasks. The VCM encoder uses the feature map extracted from the main task as a reference feature map for subtasks.

The VCM encoder extracts, from the subtasks, an original feature map of each of the subtasks by using the machine task model (S1202).

The VCM encoder generates a predicted feature map of each of the subtasks based on the reference feature map (S1204). In this case, the VCM encoder may generate a predicted feature map from the reference feature map by using the deep learning-based predictive model as described above.

The VCM encoder generates a residual feature map by subtracting the predicted feature map from the original feature map of each of the subtasks (S1206).

The VCM encoder encodes the reference feature map (S1208).

The VCM encoder encodes the residual feature map of each of the subtasks (S1210).

The VCM encoder may encode the reference feature map and the residual feature map of each subtask to generate a bitstream, and then transmit the latter to the VCM decoder.

The following details Step S1208 of the VCM encoder encoding the reference feature map.

First, the VCM encoder may encode the reference feature map without using spatial information of a frame representing the main task.

As yet another embodiment, the VCM encoder may encode the reference feature map by using spatial information of a frame representing the main task as follows.

The VCM encoder sets the neighboring block of the transport block in the frame representing the main task as the reference block (S1220).

The VCM encoder generates a feature map of the prediction block by performing prediction based on the feature map of the reference block (S1222). The VCM encoder may use an intra prediction of video coding or use a deep learning-based block prediction model as a method of generating a feature map of a prediction block.

The VCM encoder generates a residual block by subtracting the feature map of the prediction block from the feature map of the transport block (S1224).

The VCM encoder encodes the residual block (S1226). The VCM encoder generates a bitstream by encoding the residual block corresponding to the transport block, and then transmits the generated bitstream to the VCM decoder.

Figure 13:
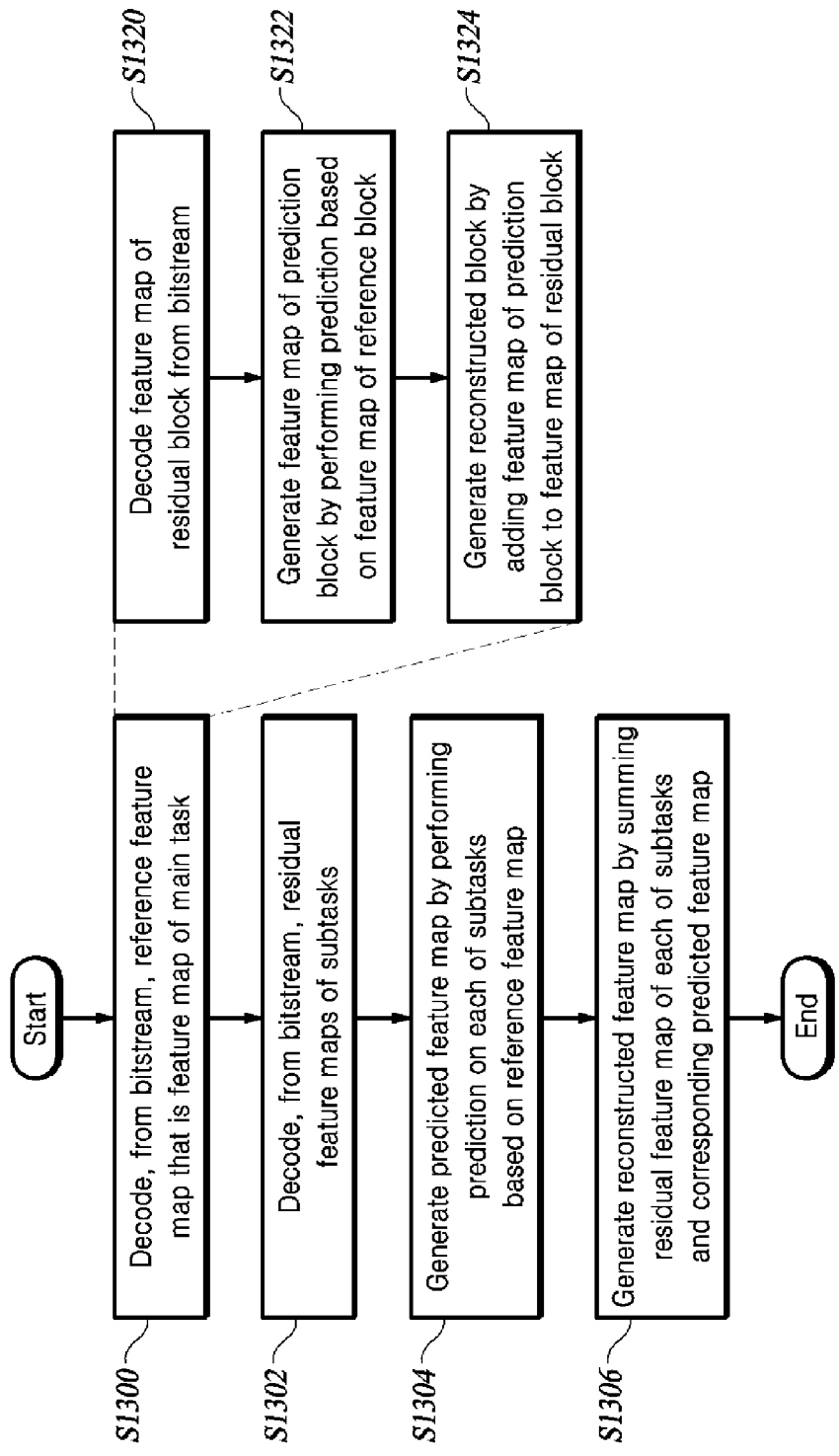
FIG. 13 is a flowchart of a VCM encoding method for performing a plurality of tasks sharing affinity, according to yet another embodiment of the present disclosure.

FIG. 13 is a flowchart of a VCM encoding method for performing a plurality of tasks sharing affinity, according to yet another embodiment of the present disclosure.

The VCM decoder decodes, from the bitstream, the reference feature map that is the feature map of the main task (S1300).

As described above, the VCM encoder measures the task affinity between target tasks and sets the task having the highest task affinity with respect to other tasks as the main task.

The VCM decoder decodes the residual feature maps of subtasks from the bitstream (S1302).

The VCM decoder generates a predicted feature map by performing prediction on each of the subtasks based on the reference feature map (S1304). Here, the VCM decoder may generate the predicted feature map from the reference feature map by using the aforementioned deep learning-based predictive model.

The VCM decoder generates a reconstructed feature map by summing the residual feature map of each of the subtasks and the corresponding predicted feature map (S1306).

The following details Step S1300 of the VCM decoder decoding the reference feature map.

First, when the reference feature map is encoded by the VCM encoder without using spatial information of a frame representing the main task, the VCM decoder may also decode the reference feature map without using spatial information.

As yet another embodiment, when the reference feature map is encoded by the VCM encoder using spatial information of the frame representing the main task, the VCM decoder may use the spatial information of the frame representing the main task to decode the reference feature map as follows.

The VCM decoder decodes the feature map of the residual block from the bitstream (S1320). Here, the residual block is a block transmitted by the VCM encoder and corresponding to the transport block in the frame representing the main task.

The VCM decoder generates a feature map of the prediction block by performing prediction based on the feature map of the reference block (S1322). The VCM decoder may use an intra prediction of video coding or use a deep learning-based block prediction model as a method of generating a feature map of a prediction block.

The VCM decoder generates a reconstructed block by adding the feature map of the prediction block to the feature map of the residual block (S1324). Thereafter, the reconstructed block may be used as a reference block.

Hereinafter, a VCM encoding method and a VCM decoding method based on the architecture of a machine task model will be described using the flowcharts of FIGS. 14 and 15.

Figure 14:
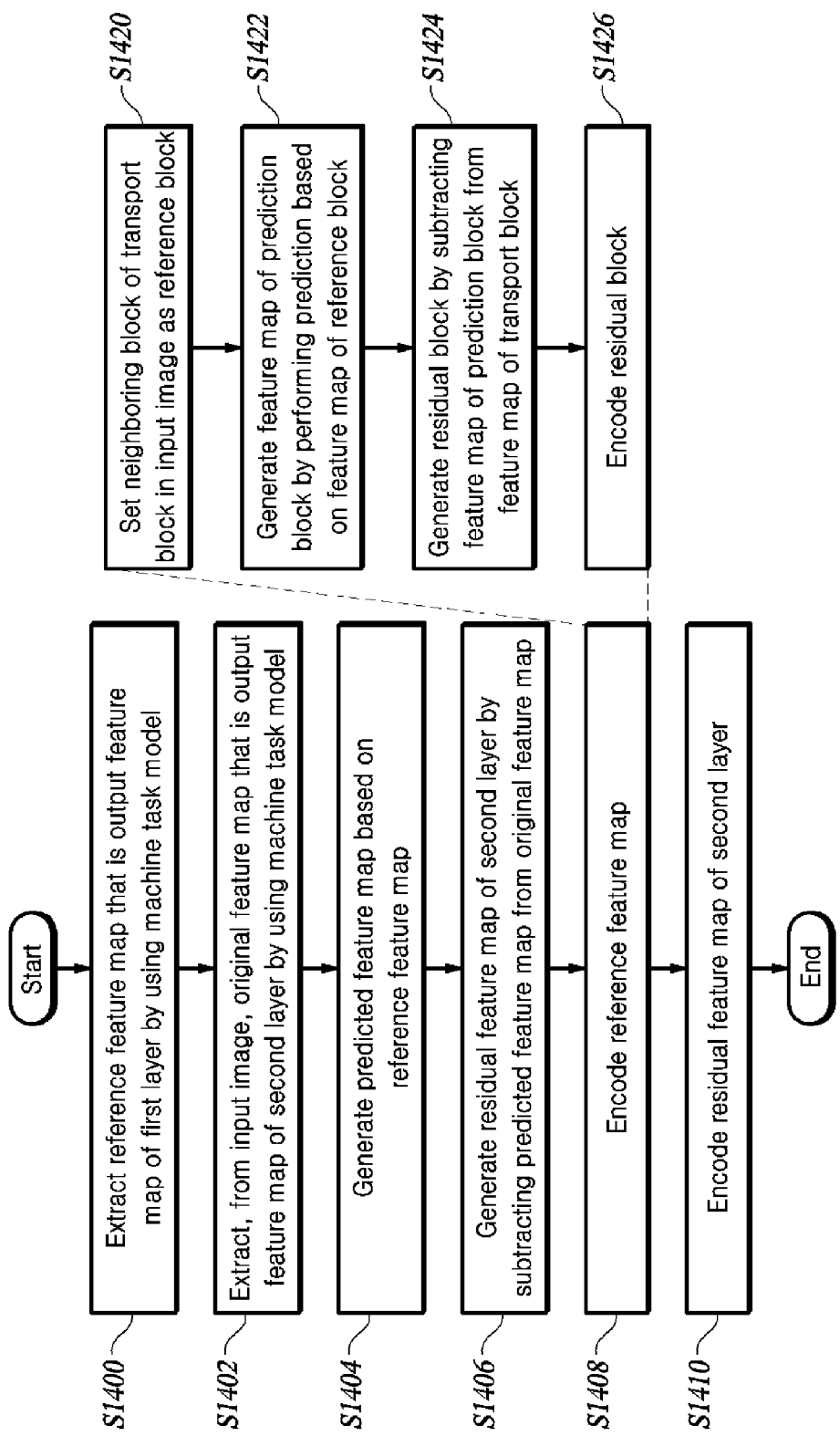
FIG. 14 is a flowchart of a VCM encoding method based on an architecture of a machine task model, according to yet another embodiment of the present disclosure.

FIG. 14 is a flowchart of a VCM encoding method based on an architecture of a machine task model, according to yet another embodiment of the present disclosure.

The VCM encoder extracts a reference feature map that is an output feature map of the first layer from an input image by using a deep learning-based machine task model (S1400).

The VCM encoder extracts, from the input image, the original feature map that is the output feature map of the second layer by using the machine task model (S1402). Here, the second layer is a layer deeper than the first layer in the machine task model.

The VCM encoder generates a predicted feature map based on the reference feature map (S1404). In this case, as described above, the VCM encoder may generate a predicted feature map from the reference feature map by using a deep learning-based predictive model.

The VCM encoder generates a residual feature map of the second layer by subtracting the predicted feature map from the original feature map of each of the remaining frames (S1406).

The VCM encoder encodes the reference feature map (S1408).

The VCM encoder encodes the residual feature map of the second layer (S1410).

The VCM encoder may generate a bitstream by encoding the reference feature map and the residual feature map of the second layer, and then transmit the generated bitstream to the VCM decoder.

The following details Step S1408 of the VCM encoder encoding the reference feature map.

First, the VCM encoder may encode the reference feature map without using spatial information of the input image.

As yet another embodiment, the VCM encoder may encode the reference feature map by using spatial information of the input image as follows.

The VCM encoder sets a neighboring block of a transport block in the input image as a reference block (S1420).

The VCM encoder generates a feature map of the prediction block by performing prediction based on the feature map of the reference block (S1422). The VCM encoder may use an intra prediction of video coding or use a deep learning-based block prediction model as a method of generating a feature map of a prediction block.

The VCM encoder generates a residual block by subtracting the feature map of the prediction block from the feature map of the transport block (S1424).

The VCM encoder encodes the residual block (S1426). The VCM encoder generates a bitstream by encoding the residual block corresponding to the transport block, and then transmits the generated bitstream to the VCM decoder.

Figure 15:
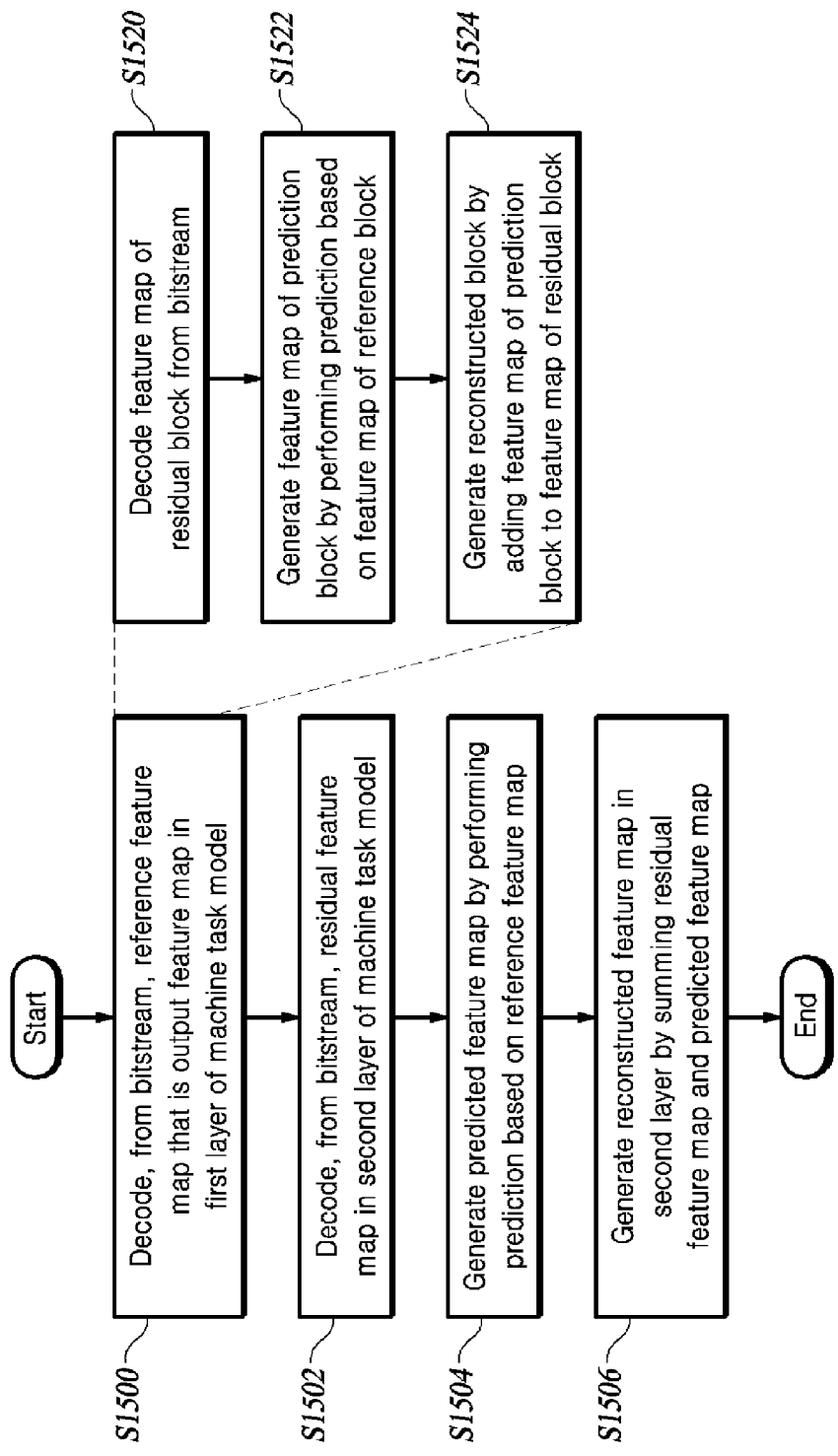
FIG. 15 is a flowchart of a VCM decoding method based on an architecture of a machine task model, according to yet another embodiment of the present disclosure.
Figure 16:
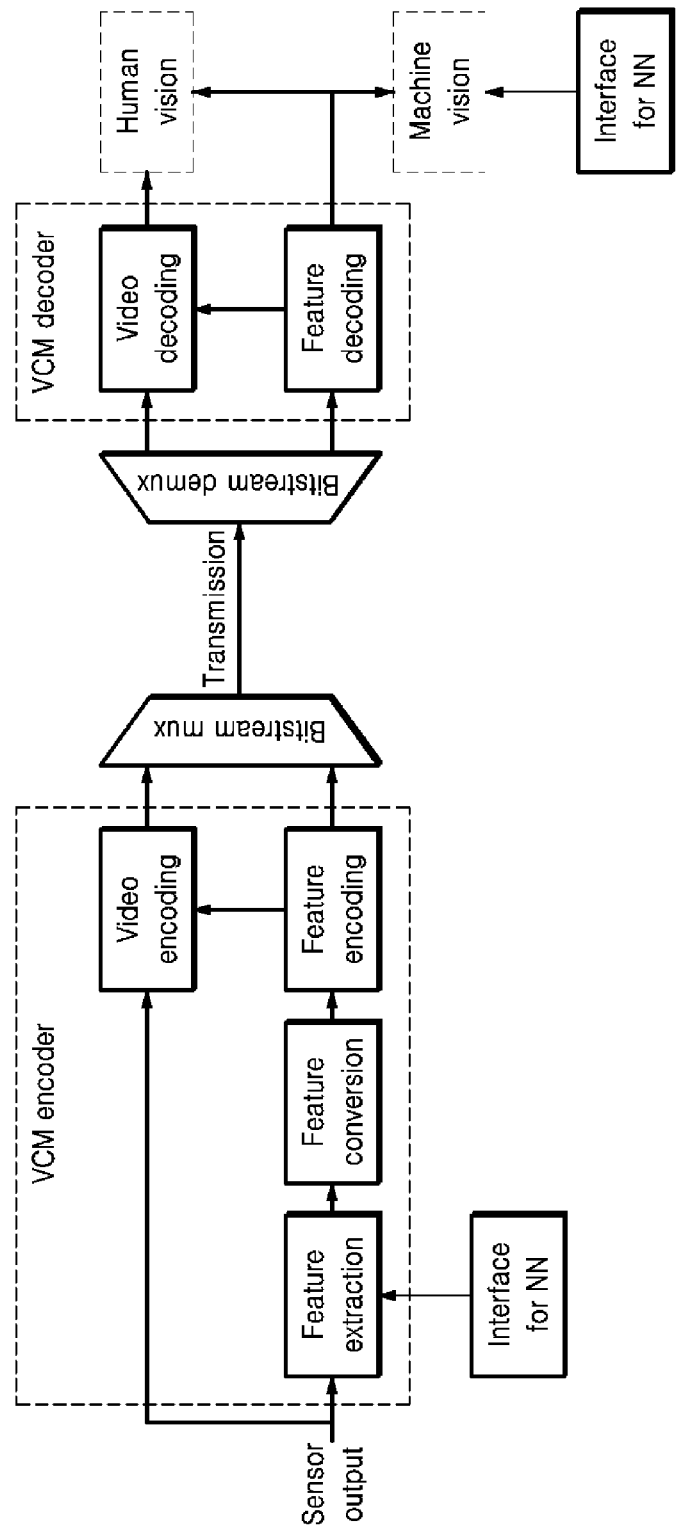
FIG. 16 is a conceptual block diagram of a VCM codec according to at least one embodiment of the present disclosure.

FIG. 15 is a flowchart of a VCM decoding method based on an architecture of a machine task model, according to yet another embodiment of the present disclosure.

The VCM decoder decodes, from the bitstream, a reference feature map that is an output feature map in the first layer of the machine task model (S1500).

The VCM decoder decodes, from the bitstream, the residual feature map in the second layer of the machine task model (S1502). Here, the second layer is a layer deeper than the first layer in the machine task model.

The VCM decoder generates a predicted feature map by performing prediction based on the reference feature map (S1504). Here, the VCM decoder may set the reference feature map as the predicted feature map. As yet another embodiment, the VCM decoder may generate the predicted feature map from the reference feature map by using the aforementioned deep learning-based predictive model.

The VCM decoder generates a reconstructed feature map in the second layer by summing the residual feature map and the corresponding predicted feature map (S1506).

Thereafter, the VCM decoder may generate the final output feature map of the machine task model by inputting the reconstructed feature map to the next layer to the second layer.

The following details Step S1500 of the VCM decoder decoding the reference feature map.

First, when the reference feature map is encoded by the VCM encoder without using spatial information of the input image, the VCM decoder may also decode the reference feature map without using spatial information.

As yet another embodiment, when the reference feature map is encoded by the VCM encoder using spatial information of the input image, the VCM decoder may decode the reference feature map by using spatial information of the input image as follows.

The VCM decoder decodes the feature map of the residual block from the bitstream (S1520). Here, the residual block is a block transmitted by the VCM encoder and corresponding to the transport block in the input image.

The VCM decoder generates a feature map of the prediction block by performing prediction based on the feature map of the reference block (S1522). The VCM decoder may use an intra prediction of video coding or use a deep learning-based block prediction model as a method of generating a feature map of a prediction block.

The VCM decoder generates a reconstructed block by adding the feature map of the prediction block to the feature map of the residual block (S1524). Thereafter, the reconstructed block may be used as a reference block.

Although the flowchart(s) or timing chart(s) of the present disclosure presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by the flowchart(s) or timing chart(s) or by performing one or more of the steps thereof in parallel, and hence the steps in the flowchart(s) or timing chart(s) are not limited to the illustrated chronological sequences.

It should be understood that the above description presents the illustrative embodiments that may be implemented in various other manners. The functions described in some embodiments may be realized by hardware, software, firmware, and/or their combination. It should also be understood that the functional components described in this specification are labelled by ". . . unit" to strongly emphasize the possibility of their independant realization.

Meanwhile, various methods or functions described in the present disclosure may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read only memory (EPROM), flash drive, optical drive, magnetic hard drive, and solid state drive (SSD) among others.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A coding method performed by a coding apparatus of a machine vision system for coding feature maps of video frames, the coding method comprising:
    extracting, from a key frame, a reference feature map that is a feature map of the key frame by using a machine task model that is based on deep learning, the key frame being selected from the video frames in terms of bit rate distortion optimization
    extracting, from remaining frames other than the key frame, an original feature map of each of the remaining frames by using the machine task model;
    generating a predicted feature map of each of the remaining frames based on the reference feature map;
    generating a residual feature map by subtracting the predicted feature map from the original feature map of each of the remaining frames;
    encoding the reference feature map; and
    encoding the residual feature map of each of the remaining frames.

2. The coding method of claim 1, wherein the generating of the predicted feature map comprises:
    performing an inter prediction based on the reference feature map to generate the predicted feature map.

3. The coding method of claim 1, wherein the generating of the predicted feature map comprises:
    using a predictive model that is based on deep learning to generate the predicted feature map from the reference feature map.

4. The coding method of claim 3, wherein the predictive model is configured to be pre-trained based on a loss function that includes a loss for promoting the predicted feature map to predict the original feature map from the reference feature map, a loss for reducing a bit number of the residual feature map, and a loss for reducing a difference between the original feature map and a reconstructed feature map that is generated by a decoding apparatus in the machine vision system.

5. The coding method of claim 3, wherein the predictive model is configured to be pre-trained end-to-end along with the machine task model.

6. The coding method of claim 1, wherein the encoding of the reference feature map comprises:
   setting a neighboring block of a transport block in the key frame as a reference block;
   generating a feature map of a prediction block by performing prediction based on a feature map of the reference block;
   generating a residual block by subtracting the feature map of the prediction block from a feature map of the transport block; and
   encoding the residual block.

7. The coding method of claim 6, wherein the generating of the feature map of the prediction block comprises:
   performing intra prediction based on the feature map of the reference block to generate the feature map of the prediction block.

8. The coding method of claim 6, wherein the generating of the feature map of the prediction block comprises:
   using a deep learning-based block prediction model to generate the feature map of the prediction block from the feature map of the reference block.

9. A coding method performed by a coding apparatus of a machine vision system for coding a feature map of a main task and feature maps of subtasks, the coding method comprising:
   extracting a reference feature map that is the feature map of the main task set among target tasks by using a machine task model that is based on deep learning;
   extracting, from the subtasks, an original feature map of each of the subtasks by using the machine task model;
   generating a predicted feature map of each of the subtasks based on the reference feature map;
   generating a residual feature map by subtracting the predicted feature map from the original feature map of each of the subtasks;
   encoding the reference feature map; and
   encoding a residual feature map of each of the subtasks.

10. The coding method of claim 9, wherein the generating of the predicted feature map comprises:
    using a predictive model that is based on deep learning to generate the predicted feature map from the reference feature map.

11. The coding method of claim 10, wherein the predictive model is configured to be pre-trained based on a loss function that includes a loss for promoting the predicted feature map to predict the original feature map from the reference feature map, a loss for reducing a bit number of the residual feature map, and a loss for reducing a difference between the original feature map and a reconstructed feature map that is generated by a decoding apparatus in the machine vision system.

12. The coding method of claim 9, wherein the encoding of the reference feature map comprises:
    setting a neighboring block of a transport block in a frame representing the main task as a reference block;
    generating a feature map of a prediction block by performing prediction based on a feature map of the reference block;
    generating a residual block by subtracting the feature map of the prediction block from a feature map of the transport block; and
    encoding the residual block.

13. The coding method of claim 12, wherein the generating of the feature map of the prediction block comprises:
    performing intra prediction based on the feature map of the reference block to generate the feature map of the prediction block.

14. The coding method of claim 12, wherein the generating of the feature map of the prediction block comprises:
    using a deep learning-based block prediction model to generate the feature map of the prediction block from the feature map of the reference block.

15. A coding method performed by a coding apparatus of a machine vision system for coding a feature map of a machine task model including a plurality of layers, the coding method comprising:
    extracting, by using the machine task model and from an input image, a reference feature map that is an output feature map of a first layer;
    extracting, by using the machine task model and from the input image, an original feature map that is an output feature map of a second layer that is a layer deeper than the first layer in the machine task model;
    generating a predicted feature map based on the reference feature map;
    generating a residual feature map of the second layer by subtracting the predicted feature map from the original feature map;
    encoding the reference feature map; and
    encoding the residual feature map of the second layer.

16. The coding method of claim 15, wherein the generating of the predicted feature map comprises:
    using a predictive model that is based on deep learning to generate the predicted feature map from the reference feature map.

17. The coding method of claim 16, wherein the predictive model is configured to be pre-trained based on a loss function that includes a loss for promoting the predicted feature map to predict the original feature map from the reference feature map, a loss for reducing a bit number of the residual feature map, and a loss for reducing a difference between the original feature map and a reconstructed feature map that is generated by a decoding apparatus in the machine vision system.

18. The coding method of claim 15, wherein the encoding of the reference feature map comprises:
    setting a neighboring block of a transport block in the input image as a reference block;
    generating a feature map of a prediction block by performing prediction based on a feature map of the reference block;
    generating a residual block by subtracting the feature map of the prediction block from a feature map of the transport block; and
    encoding the residual block.

19. The coding method of claim 18, wherein the generating of the feature map of the prediction block comprises:
    performing intra prediction based on the feature map of the reference block to generate the feature map of the prediction block.

20. The coding method of claim 18, wherein the generating of the feature map of the prediction block comprises:

using a deep learning-based block prediction model to generate the feature map of the prediction block from the feature map of the reference block.

* * * * *